US010828969B2

(12) United States Patent
Erhardt et al.

(10) Patent No.: US 10,828,969 B2
(45) Date of Patent: Nov. 10, 2020

(54) CAB DOOR

(71) Applicant: Clark Equipment Company, West Fargo, ND (US)

(72) Inventors: Cody Erhardt, Bismarck, ND (US); Ronald S. Hansen, Leonard, ND (US); Jonathan J. Roehrl, Bismarck, ND (US); Brian P. Dehnert, Mandan, ND (US); David Glasser, Bismarck, ND (US)

(73) Assignee: CLARK EQUIPMENT COMPANY, West Fargo, ND (US)

( * ) Notice: Subject to any disclaimer, the term of this patent is extended or adjusted under 35 U.S.C. 154(b) by 35 days.

(21) Appl. No.: 16/183,377

(22) Filed: Nov. 7, 2018

(65) Prior Publication Data

US 2019/0135091 A1    May 9, 2019

Related U.S. Application Data

(60) Provisional application No. 62/582,538, filed on Nov. 7, 2017.

(51) Int. Cl.
*B60J 5/02* (2006.01)
*E02F 9/16* (2006.01)
(Continued)

(52) U.S. Cl.
CPC ............... *B60J 5/02* (2013.01); *B60J 10/84* (2016.02); *B60J 10/86* (2016.02); *E02F 9/163* (2013.01);
(Continued)

(58) Field of Classification Search
CPC .......... B60J 5/02; B60J 5/0472; B60J 5/0487; B62D 33/0617; E02F 9/163; E05D 15/02;
(Continued)

(56) References Cited

U.S. PATENT DOCUMENTS 2,533,548 A * 12/1950 Backer ................... B60J 5/0472
244/121
4,260,320 A    4/1981 Steiger
(Continued)

FOREIGN PATENT DOCUMENTS

DE      4404415 A1    8/1995
JP     H10219743 A    8/1998

OTHER PUBLICATIONS

Invitation to Pay Additional Fees, and, Where Applicable, Protest Fee dated Feb. 5, 2019 for International Application No. PCT/US2018/059630 filed Nov. 7, 2018, 11 pages.
(Continued)

*Primary Examiner* — Gregory A Blankenship
(74) *Attorney, Agent, or Firm* — John Veldhuis-Kroeze; Westman, Champlin & Koehler, P.A.

(57) ABSTRACT

Disclosed are front entry cabs, and power machines with front entry cabs, having a door that is moveable between opened and closed positions. In the opened position, the door is positioned within an operator compartment of the cab above the operator seat and below a top of the cab. A linkage system defines the travel path of the door between closed and opened positions. The linkage system is configured to minimize interference with operator visibility.

18 Claims, 35 Drawing Sheets

(51) Int. Cl.
*F16H 21/44* (2006.01)
*B60J 10/84* (2016.01)
*E05D 7/00* (2006.01)
*E05D 15/02* (2006.01)
*E05D 15/58* (2006.01)
*B60J 10/86* (2016.01)
*E05D 15/42* (2006.01)
*E05F 15/59* (2015.01)
*E05F 15/53* (2015.01)

(52) U.S. Cl.
CPC .............. *E05D 7/00* (2013.01); *E05D 15/02* (2013.01); *E05D 15/42* (2013.01); *E05D 15/581* (2013.01); *F16H 21/44* (2013.01); *E05D 2015/586* (2013.01); *E05F 15/53* (2015.01); *E05F 15/59* (2015.01); *E05Y 2201/624* (2013.01); *E05Y 2201/684* (2013.01); *E05Y 2201/708* (2013.01); *E05Y 2800/28* (2013.01); *E05Y 2900/518* (2013.01)

(58) Field of Classification Search
CPC ..... E05D 15/401; E05D 15/42; E05D 15/425; E05D 15/44; E05D 15/445; E05D 15/581; E05D 15/46; E05D 15/463; E05D 2015/586; E05Y 2201/624; E05Y 2201/684; F16H 21/44; E05F 15/53; E05F 15/59

USPC .................................................. 296/190.11
See application file for complete search history.

(56) References Cited

U.S. PATENT DOCUMENTS

| | | | | |
|---|---|---|---|---|
| 4,880,269 | A * | 11/1989 | Jensen | B60J 1/04 296/190.1 |
| 5,362,118 | A * | 11/1994 | Houriez | B60J 1/04 296/190.1 |
| 8,016,345 | B1 * | 9/2011 | Goddard | B60J 5/02 296/146.11 |
| 10,030,362 | B2 * | 7/2018 | Yamashita | E02F 3/3414 |
| 10,168,392 | B2 * | 1/2019 | Leary | G01R 33/02 |
| 2006/0267379 | A1 * | 11/2006 | Johnson | B60J 7/04 296/190.08 |
| 2009/0192682 | A1 | 7/2009 | Ciarla et al. | |
| 2011/0233963 | A1 * | 9/2011 | Yamashita | B62D 33/0617 296/190.11 |
| 2019/0135091 | A1 * | 5/2019 | Erhardt | B60J 10/86 |
| 2019/0143797 | A1 * | 5/2019 | Gupta | E06B 9/581 296/190.11 |

OTHER PUBLICATIONS

International Search Report and Written Opinion dated May 6, 2019 for International Application No. PCT/US2018/059630 filed Nov. 7, 2018, 24 pages.

\* cited by examiner

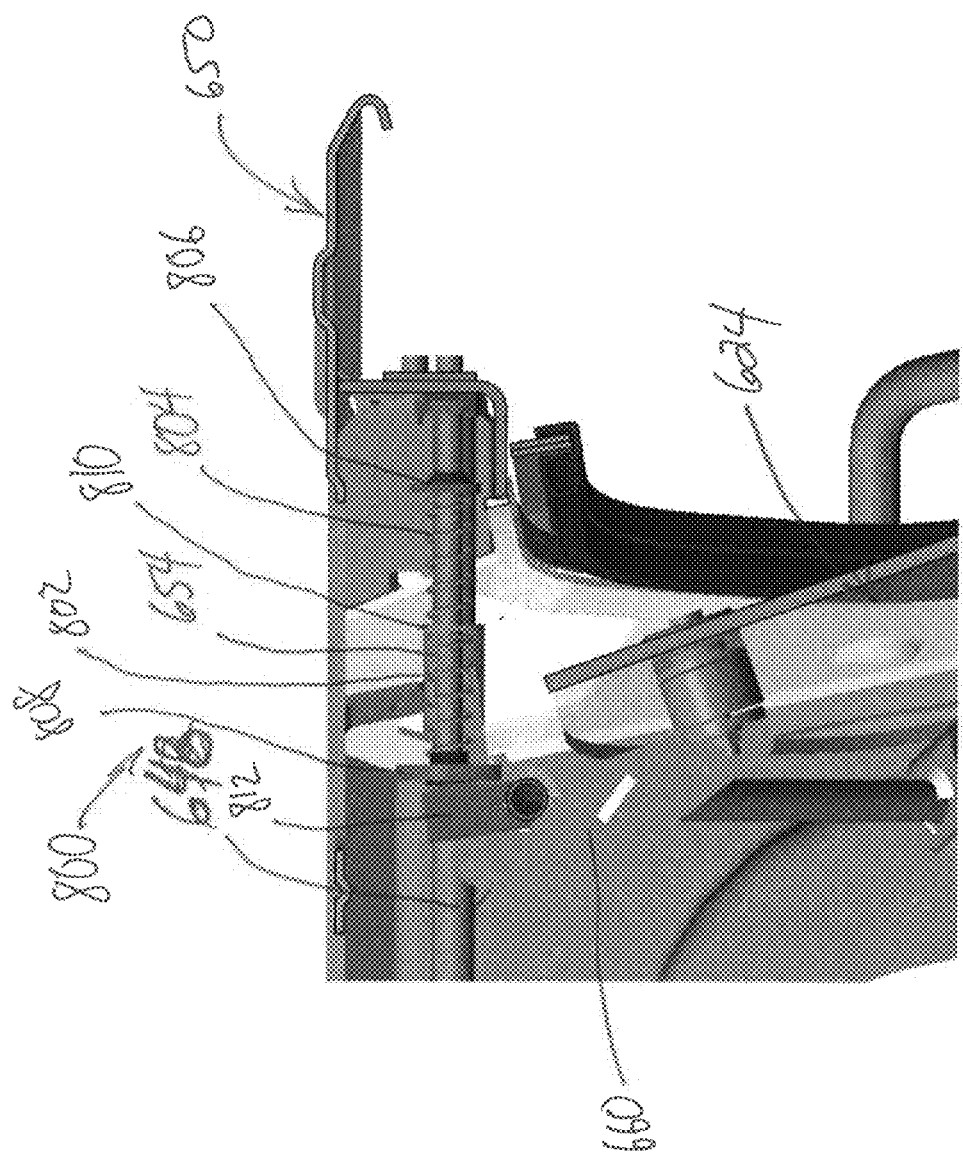

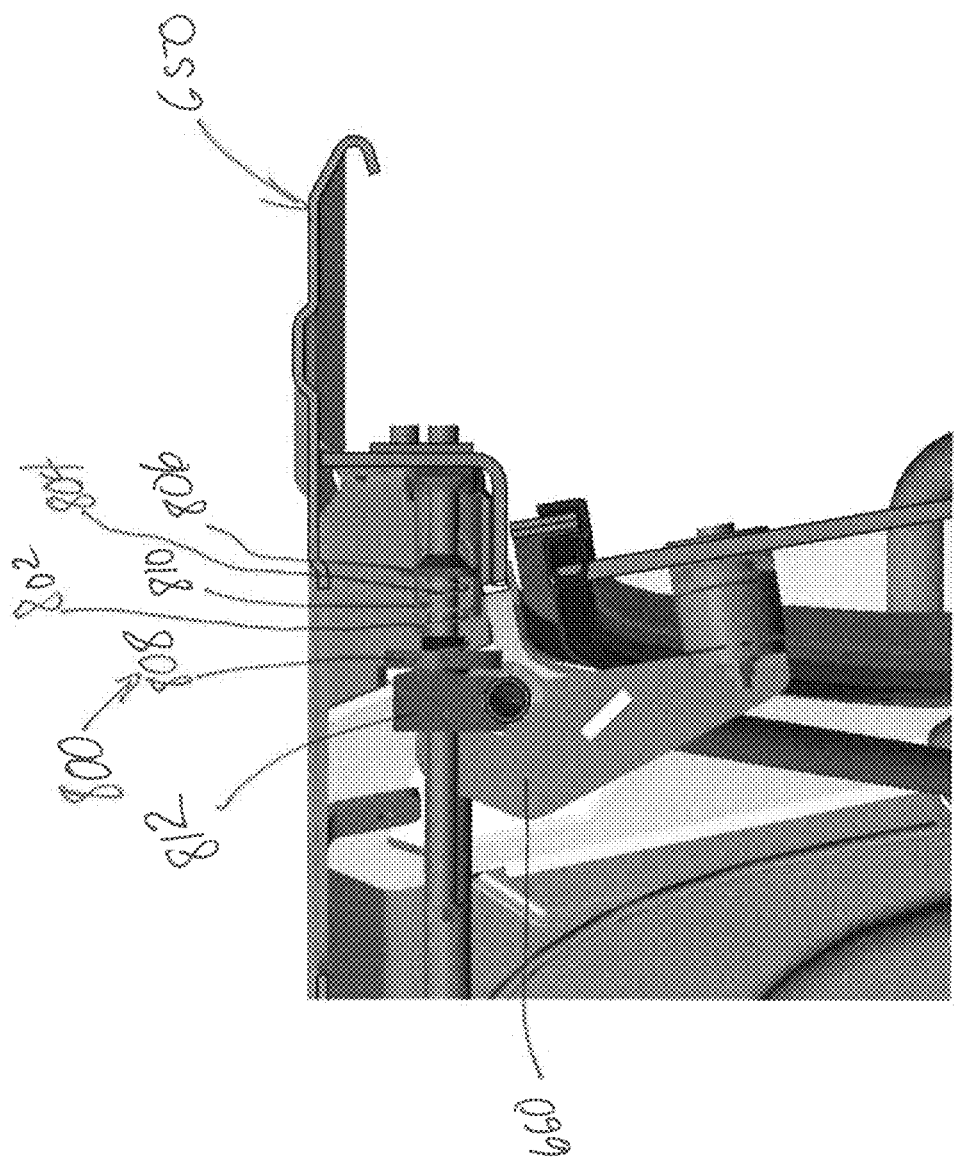

CAB DOOR

CROSS-REFERENCE TO RELATED APPLICATION

This application claims the benefit of U.S. Provisional Application No. 62/582,538, which was filed on Nov. 7, 2017.

BACKGROUND

The present disclosure is directed toward power machines. More particularly, the present disclosure is related to doors on cabs of power machines.

Power machines, for the purposes of this disclosure, include any type of machine that generates power for the purpose of accomplishing a particular task or a variety of tasks. One type of power machine is a work vehicle. Work vehicles, such as loaders, are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Many power machines have operator compartments defined, at least in part, by a cab in which an operator can sit while operating the power machine. Some of these cabs have doors that can be opened to allow access into and out of the cab and can be closed to provide protection from the elements and the like when an operator is located within the cab. Some loaders with front door entry have lift arms that move in front of the cab such that the door must be closed while operating the power machine otherwise the door, in the open position, will interfere with the travel path of the lift arm.

The discussion above is merely provided for general background information and is not intended to be used as an aid in determining the scope of the claimed subject matter.

SUMMARY

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Disclosed are cabs, and power machines with cabs that have a door that is moveable between opened and closed positions. In some exemplary embodiments, in the opened position, the door is positioned within an operator compartment of the cab above the operator seat and below a top of the cab. Various linkage configurations, including, in some embodiments, a four-bar linkage attaches the door to the cab and defines the travel path of the door between closed and opened positions. The linkage configurations are advantageously designed to minimize interference with operator visibility and maintain sufficient head room when the door is in an opened position.

In some exemplary embodiments, a cab for a power machine comprises a frame having first and second side walls, a top portion, a front portion having a door opening for cab ingress and egress, and a rear portion. A cab door is configured to be positioned in the door opening when in a fully closed position. An operator seat having a seat back is positioned in the cab, along with a joystick controller positioned forward of the operator seat. A linkage configuration includes portions of the first side wall, the door, and first and second links each pivotally coupled to the first side wall and to the door. The linkage configuration is adapted to support the door and define a path between fully closed and fully opened positions. In the fully opened position, the door may extend beyond a rear wall that defines an operator compartment.

In some embodiments that have four bar linkage configurations, each of the first and second links comprises two link sections oriented at an obtuse angle relative to each other such that the first and second links are substantially masked by a cab structure when the door is in the fully closed position.

In some embodiments, the pivotal connection of the first link to the first side wall is positioned below the operator seat and rearward of the seat back.

In some embodiments, the pivotal connection of the second link to the first side wall is positioned vertically near a horizontal reinforcing member of the first side wall and below a horizontal center line of the first side wall.

In some embodiments, the linkage and door are configured such that when the door is in the fully opened position, the door is positioned below the top portion of the frame and extends through an opening of the rear portion of the frame and into a cover that is attached to the cab.

These and other features of the disclosed cabs and power machines are described in detail below. The above described and other features of the various disclosed embodiments can be included in differing combinations.

DRAWINGS

FIG. 35 illustrates a cushioning system for engaging the cab door of FIG. 21 as it moves toward a closed position.

FIG. 36 illustrates the cushioning system of FIG. 35 when the cab door is in a closed position.

DETAILED DESCRIPTION

The concepts disclosed in this discussion are described and illustrated by referring to illustrative embodiments. These concepts, however, are not limited in their application to the details of construction and the arrangement of components in the illustrative embodiments and are capable of being practiced or being carried out in various other ways. The terminology in this document is used for description and should not be regarded as limiting. Words such as "including," "comprising," and "having" and variations thereof as used herein are meant to encompass the items listed thereafter, equivalents thereof, as well as additional items.

Disclosed are cabs, and power machines with cabs, having doors that are moveable between opened and closed positions. In some illustrative embodiments, the door is positioned within an operator compartment of the cab above the operator seat and below a top of the cab when in the opened position. In some embodiments, a linkage configuration attaches the door to the cab and defines the travel path of the door between the closed and opened positions. In some of these embodiments, the linkage configuration is a four-bar linkage that includes links that are shaped to minimize interference with operator visibility. These and other features of the disclosed cabs and power machines are described in detail below.

Figure 2:
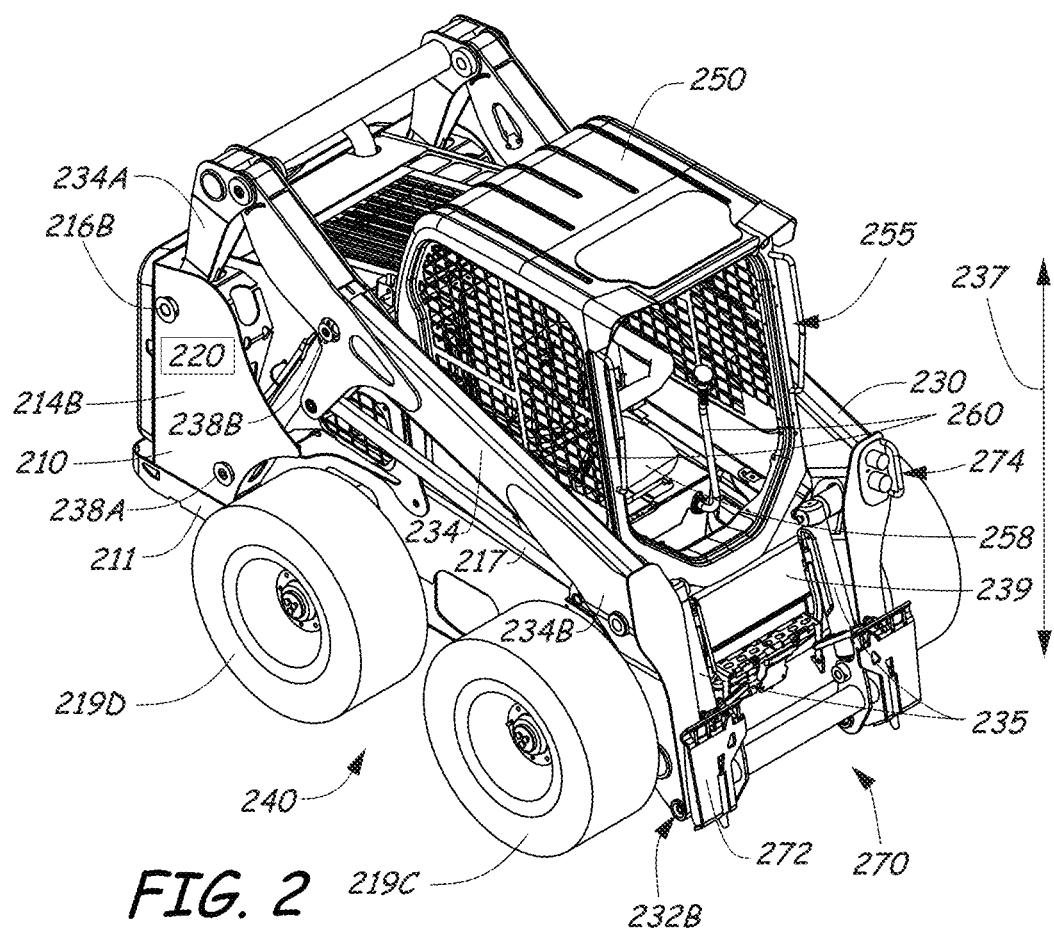
FIGS. 2-3 illustrate perspective views of a representative power machine in the form of a skid-steer loader of the type on which the disclosed embodiments can be practiced.
Figure 3:
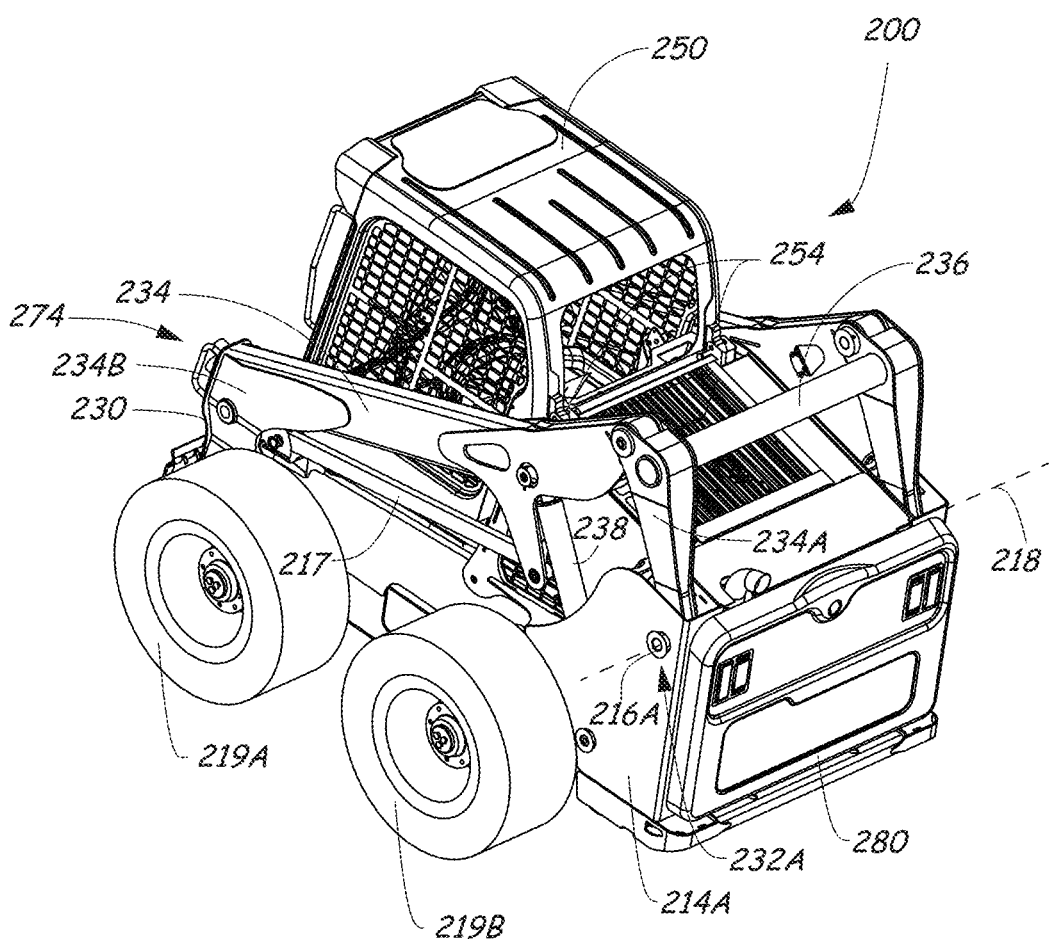

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of several power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
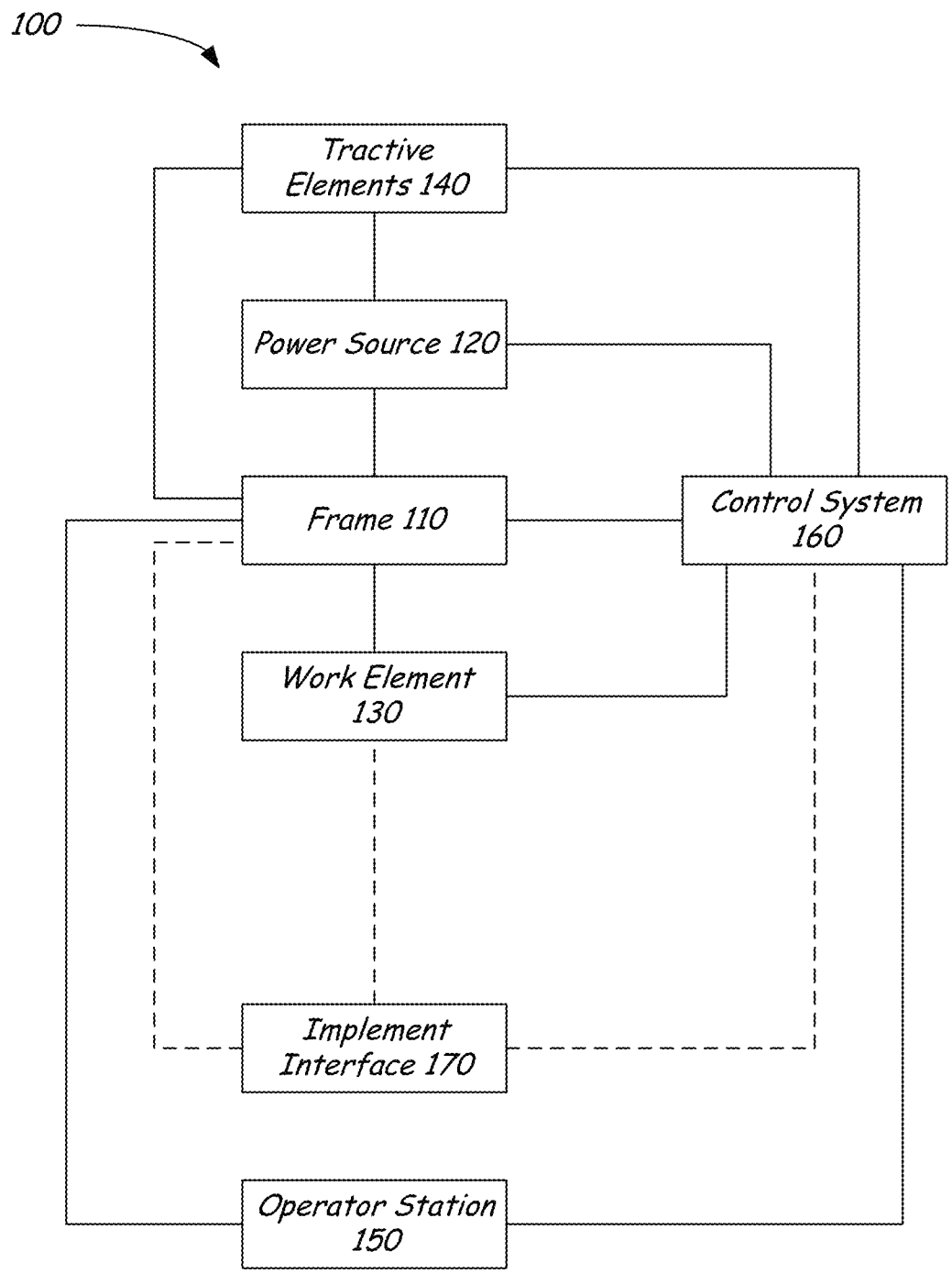
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement for performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of several implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame. Power machine 100 includes an operator station 150 that includes an operating position from which an operator can control operation of the power machine. In some power machines, the operator station 150 is defined by an enclosed or partially enclosed cab.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to mode the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, and dozers, to name but a few examples.

Loader 200 includes frame 210 that supports a power system 220, the power system can generate or otherwise providing power for operating various functions on the power machine. Power system 220 is shown in block diagram form, but is located within the frame 210. Frame 210 also supports a work element in the form of a lift arm assembly 230 that is powered by the power system 220 and can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and securing various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 is accessible from an opening in the front of the cab. Although not shown in FIGS. 2-3, in many instances, a door is provided to cover the opening and is positionable between a closed and an opened position. Many of these doors are pivotally mounted about a vertical axis so that door pivots outward from the door when in the opened position. When the door is in the opened position, it is necessary for the lift arm 234 (as discussed below) to be in in the lowered position because the door would otherwise interfere with the lift arm or components on the lift arm, specifically tilt cylinder actuators. Cab 250 can be pivoted back about an axis that extends through mounts 254 to provide access to power system components as needed for maintenance and repair. Access to power system components can also be provided by opening a tailgate 280 that is pivotally mounted to the frame 210 of the power machine at a rear end thereof.

The operator station 255 includes an operator seat 258 and a plurality of operation input devices, including control levers 260 that an operator can manipulate to control various machine functions. Operator input devices can include buttons, switches, levers, sliders, pedals and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can be dedicated to provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various frame components that support various work elements. The elements of frame 210 discussed herein are provided for illustrative purposes and frame 210 is not the only type of frame that a power machine on which the embodiments can be practiced can employ. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

As referred to briefly above, the lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The first portions 234A of the lift arms 234 are each coupled to each other via a cross member 236. Cross member 236 provides increased structural stability to the lift arm assembly 230. The second portions 234B via a cross member 239 that is attached to each of the second portions of the lift arms 234B. Cross member 239 provides increased structural stability to the lift arm assembly 230.

A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 232 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 234. The implement interface 270 includes an implement carrier 272 that can accept and securing a variety of different implements to the lift arm 230. Such implements have a complementary machine interface that is configured to be engaged with the implement carrier 272. The implement carrier 272 is pivotally mounted at the second end 232B of the arm 234. Implement carrier actuators 235 are operably coupled the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as loader 200, unless otherwise noted or recited, the concepts discussed below are not intended to be limited in their application to the environments specifically described above.

Figure 4:
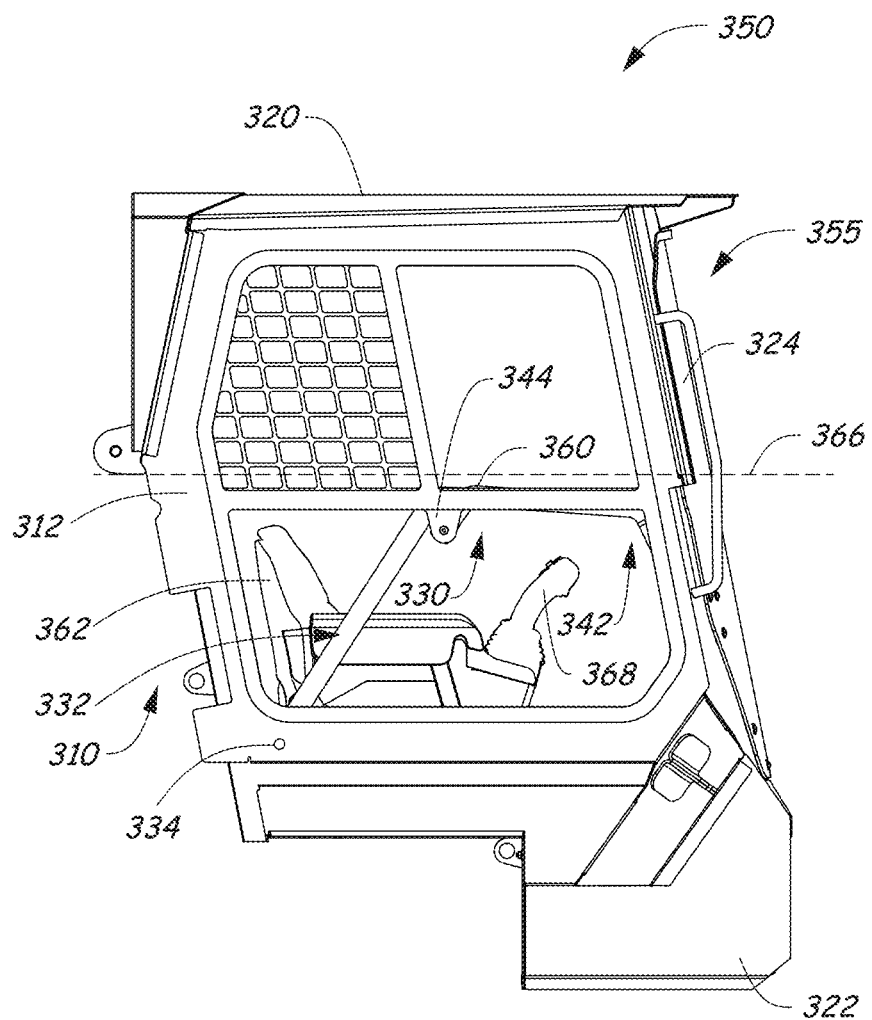
FIG. 4 is a side view illustration of a cab with a door in a closed position and moveable between the closed position and an open position by rotating upward and downward within the cab according to one illustrative embodiment.
Figure 4A:
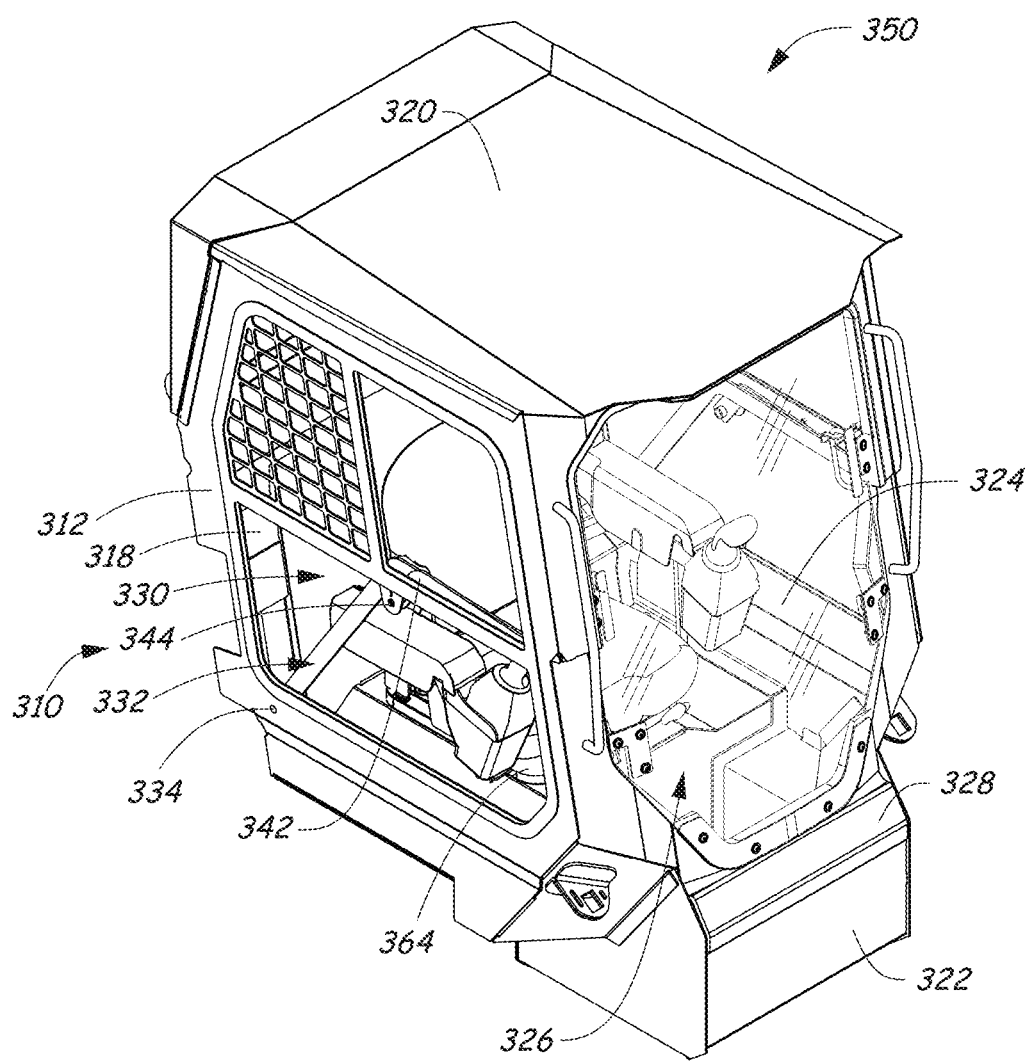
FIG. 4A is a perspective view illustration of the cab shown in FIG. 4 with the door in the closed position.

FIGS. 4 and 4A are side and perspective view illustrations of a cab 350 providing an operator compartment or station 355 according to one illustrative embodiment. Cab 350 is generally similar to the cab 250 and provides an operator station such as operator station 150 discussed above. Cab 350 provides an improved structure which allows a door to be moved between closed and opened positions in a manner which provides an operator better cab ingress and egress, prevents door interference with a lift arm structure, and minimizes interference with operator visibility. Other benefits of some disclosed embodiments will also be apparent in the following disclosure.

Figure 5:
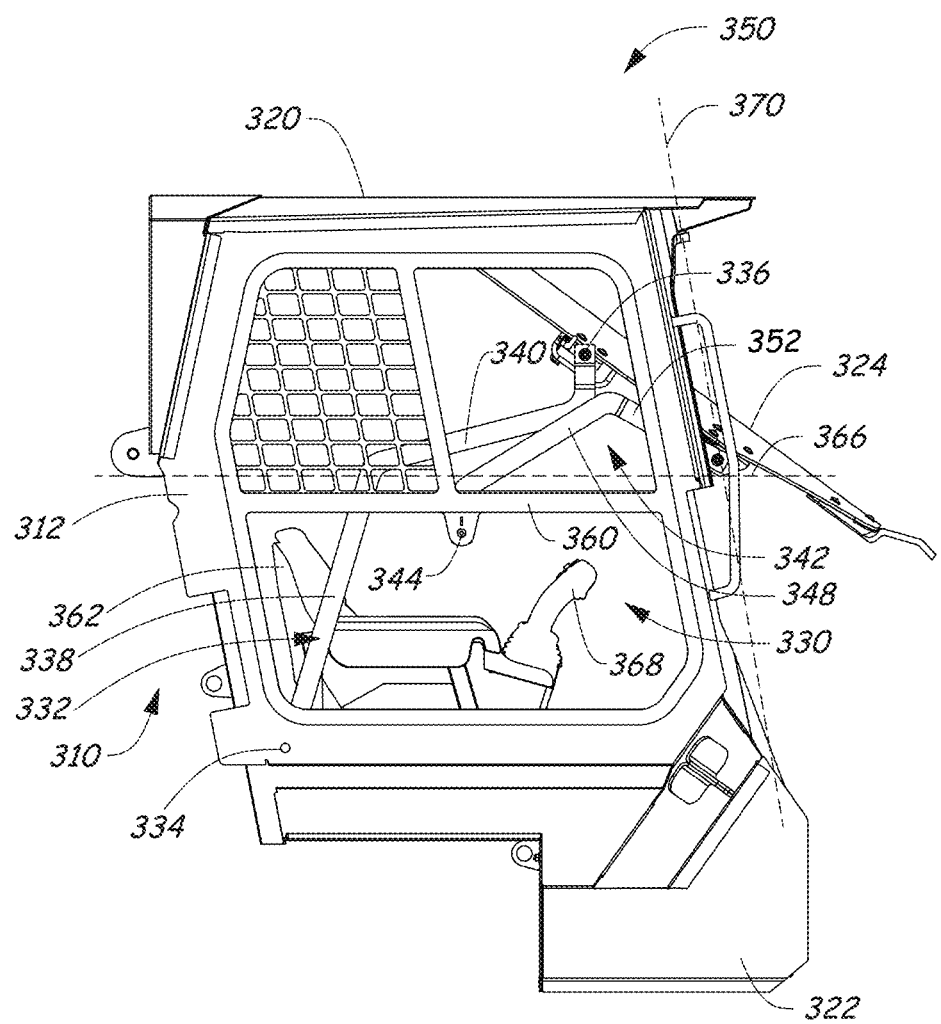
FIG. 5 is a side view illustration of the cab shown in FIG. 4 with the door in a partially opened position.
Figure 5A:
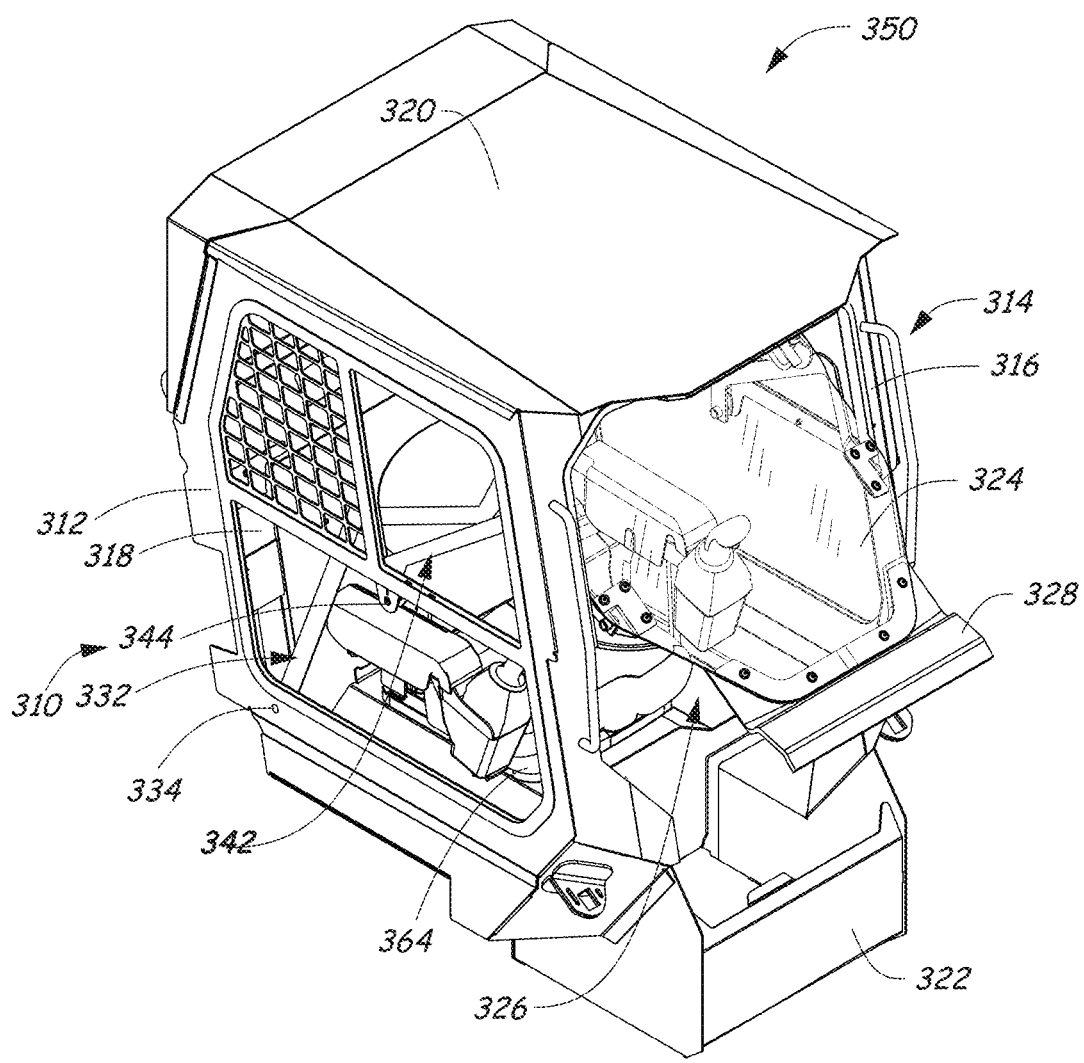
FIG. 5A is a perspective view illustration of the cab shown in FIG. 5 with the door in the partially opened position.
Figure 6:
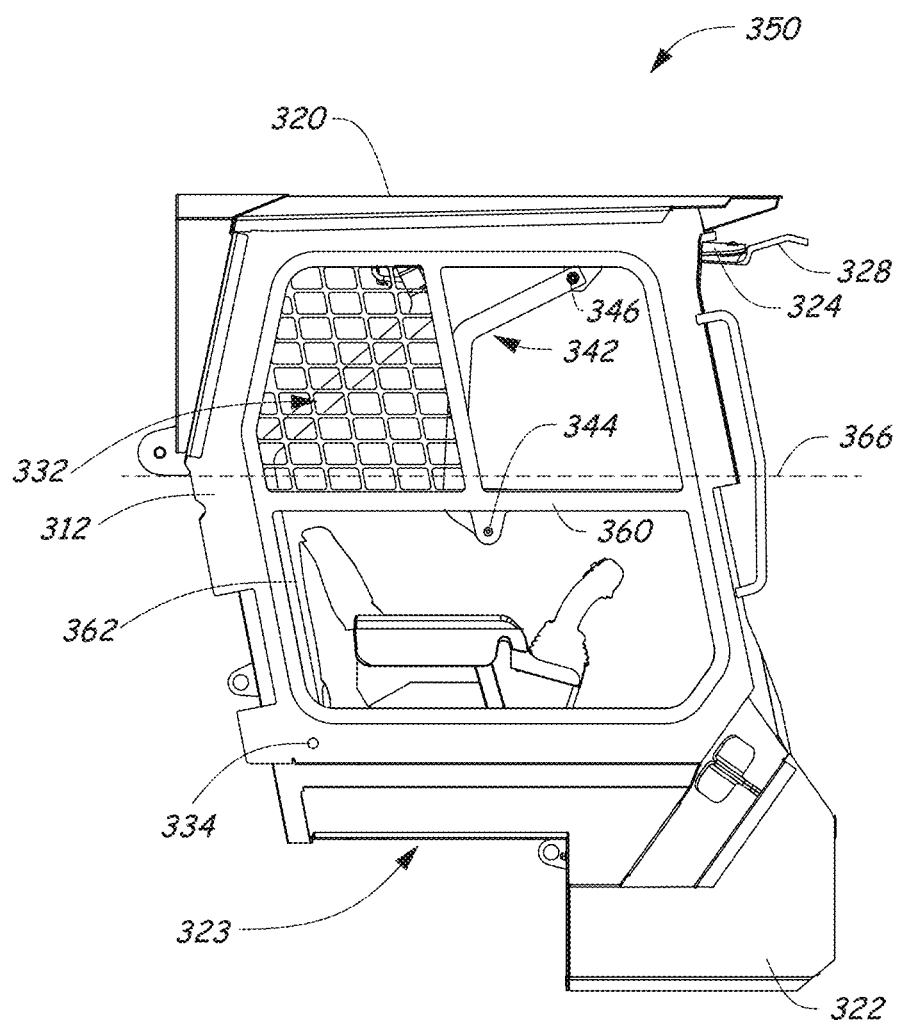
FIG. 6 is a side view illustration of the cab shown in FIG. 4 with the door in a fully opened position.
Figure 6A:
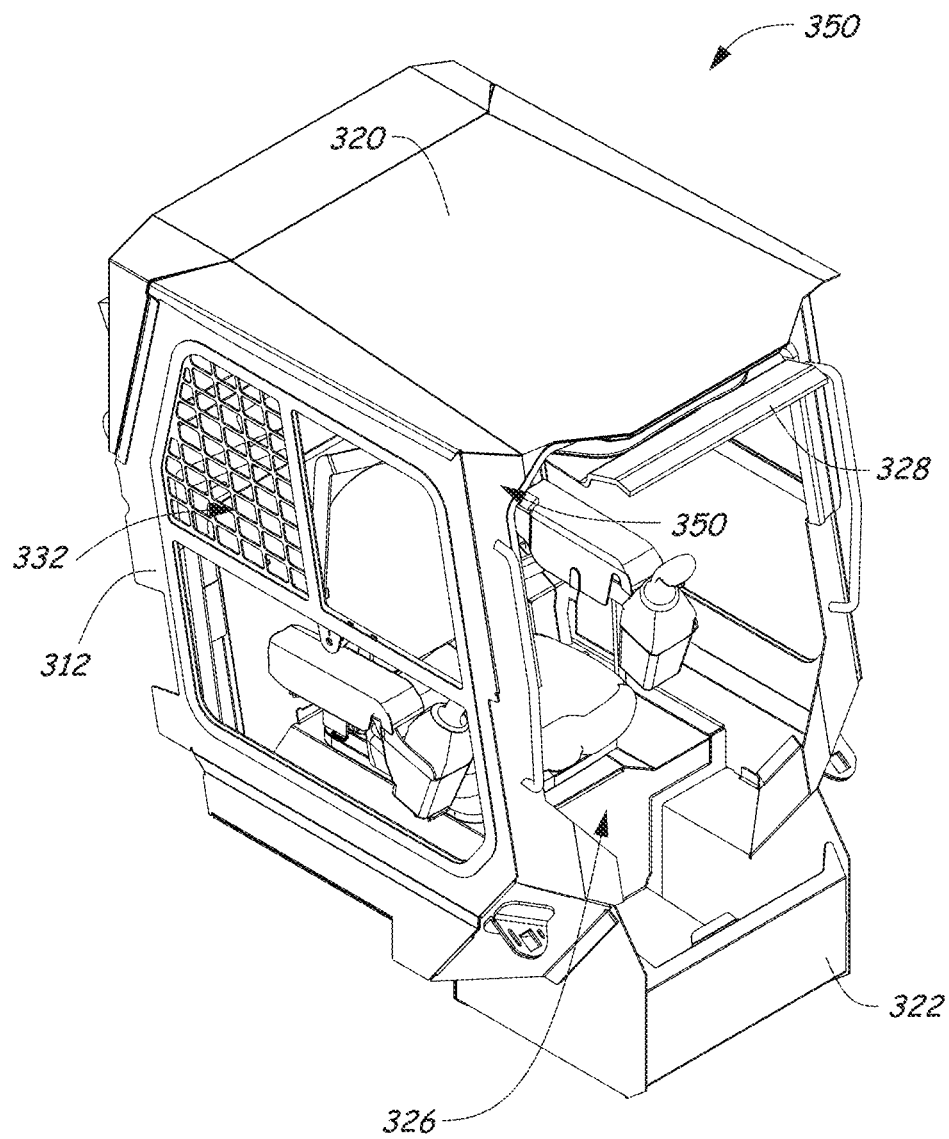
FIG. 6A is a perspective view illustration of the cab shown in FIG. 6 with the door in the fully opened position.

Cab 350 has a cab frame 310 having first and second side walls 312 and 314, a front 316, a rear 318, a top 320, and a bottom 323. A seat 364 is supported on the bottom of the cab frame. The cab frame 310 also defines a lower portion 322 where an operator can position feet during machine operation. In FIGS. 4 and 4A, a cab door 324 is in a closed position at the front of the operator compartment 355 covering an opening 326 in front portion 316 of frame 310. FIGS. 5 and 5A illustrate cab door 324 in a partially open position, and FIGS. 6 and 6A illustrate cab door 324 in a fully open position. Cab door 324 includes, in some embodiments, a cover portion 328 which at least partially covers and/or forms a part of, lower portion 322 when door 324 is in the illustrated closed position. In some exemplary embodiments, cover 328 is raised and lowered with door 324. Thus, when door 324 is raised to the open position shown in FIGS. 6 and 6A, the opening 326 through which the operator moves into and out of the cab is enlarged to provide improved ingress and egress. The cover portion 328 is shown as extending beyond top 320 in the opened position, but in some embodiments, the cover portion does not extend beyond the top 320.

In some exemplary embodiments, a linkage 330 is provided on each of first and second sides 312 and 314 to couple door 324 to frame 310 and to control movement of the door between closed and open positions along a configured path. The linkage 330 shown in FIGS. 4-6A is a four-bar linkage arrangement that includes a first link 332 and a second link 342 each of which are pivotally attached to the frame 310 and the door 324. Portions of the frame 310 between attachment points of links 332 and 342 to the frame acts as the third link of the four-bar linkage. The portion of the door 324 between the connection points provides the fourth link of the four-bar linkage 330. In exemplary embodiments, four-bar linkage 330 includes features which provide a movement path for door 324 such that, when moved to a fully open position (shown in FIGS. 6 and 6A), door 324 is positioned horizontally above the operator's head, but inside of the cab. Thus, in the fully opened position, door 324 extends at least partially horizontally beneath top frame portion 320 as is discussed below in greater detail. While raising door 324 along the movement path provided by four-bar linkage 330, door 324 extends beyond a front plane (represented by dashed line 370) of cab 350 as shown FIG. 5, but does not interfere with any lift arm of the power machine. Alternatively, the door can be positioned so that it does not extend beyond a front plane of the cab 350.

In the illustrated embodiment, first link 332 of the four-bar linkage has a first pivot connection 334 to the frame 310 configured to allow link 332 to rotate relative to frame 310. Link 332 also has a second pivot connection 336, to door 324, which is better shown in the partially open-door position of FIGS. 5 and 5A. Second pivot connection 336 is configured to allow link 332 and door 324 to pivot relative to one another. In some exemplary embodiments, first link 332 includes at least a first link section 338 and a second link section 340, which are best shown in FIG. 5. Link sections 338 and 340 of first link 332 are rigidly connected or continuously formed such that sections 338 and 340 do not pivot or rotate relative to each other. In some embodiments, link sections 338 and 340 are oriented or arranged such that the link sections form an obtuse angle relative to one another. Forming an obtuse angle between link sections 338 and 340 of first link 332 can, in various embodiments, serve several purposes. For example, such a configuration provides the range of motion over which door 324 movement is constrained between the closed and open positions. Further, while providing that door movement, the obtuse angle between link sections 338 and 340 allows link section 340 to be positioned along a horizontally extending reinforcement 360 of the cab side wall 312 when door 324 is in the closed position. This prevents or reduces obstruction of the operator's view by first link 332, and thereby improves visibility.

Similar to first link 332, second link 342 of the four-bar linkage has a first pivot connection 344 to the frame 310 configured to allow link 342 to rotate relative to frame 310. For example, pivot connection 344 can be on or near horizontally extending reinforcement 360, or elsewhere on side wall 312. As shown in the simplified illustration of FIGS. 4-6A, portions of horizontally extending reinforcement 360 or of side wall 312 are removed to better show a location of pivot connection 344. Second link 342 also has a second pivot connection 346, to door 324, which is again better shown in FIGS. 5 and 5A. Second pivot connection 346 is configured to allow link 342 and door 324 to pivot relative to one another.

Like first link 332, in some exemplary embodiments, second link 342 includes at least a first link section 348 and a second link section 352, which are best shown in FIG. 5. Link sections 348 and 352 of second link 342 are rigidly connected or continuously formed such that sections 348 and 352 do not pivot or rotate relative to each other. Also like first link 332, in some embodiments of second link 342, link sections 348 and 352 are oriented or arranged such that the link sections form an obtuse angle relative to one another in order to move door 324 along the desired path, and in order to allow link section 352 to be positioned along horizontally extending reinforcement 360 when door 324 is in the closed position. The obtuse angle formed by sections of link 342 need not be the same as the obtuse angle formed by sections of link 332. This masking of the links 332 and 342 by the cab structure when the door is in the closed position can provide significant improvement in side visibility by an operator of the power machine. Also, providing the links 332 and 342 as shown for each four-bar linkage allows coupling of the door 324 to the cab without hindering or interfering with forward visibility of the operator when the door is in the fully opened position shown in FIGS. 6 and 6A. In other embodiments, the linkage is positioned in alternative positions so as to remain as unobtrusive to the operator as possible. One advantageous feature of the linkage configuration shown in FIGS. is that as the door moves from a closed position to an open position, a bottom portion of the door extends out of the operator compartment space. As a result, the door moves along a path that allows for maximum headroom while the door is moving. In addition, the portion of the door that extends out of the cab also clears the lift arm no matter where the lift arm is positioned along its travel path.

In exemplary embodiments, placement of pivot connections 334 and 344 has been found to allow for improved or optimized operation of the four-bar linkage 330 in moving door 324 along its configured path, while also allowing impact on visibility to be reduced. For example, in some exemplary embodiments, it has been found that placement of lower pivot connection 334, from a side view perspective, rearward of an operator seatback 362 and below an operator seat 364 provides improved results. Also, in some exemplary embodiments, it has been found that placement of upper pivot connection 344 vertically near the horizontal reinforcing member 360 is beneficial. In some alternative or more specific embodiments, placement of upper pivot connection 344 below a horizontally extending center line 366 (centered vertically) of the cab side wall 312 provides improved results. In some embodiments, upper pivot connection 344 can be in a position forward of seat back 362 but rearward of joystick 368. For example, upper pivot connection 344 can be positioned at or adjacent to the Seat Index Point (SIP) for the operator seat, as defined by the seat manufacturer according to a standard such as the European Standard EN ISO 3411:2007.

Figure 7:
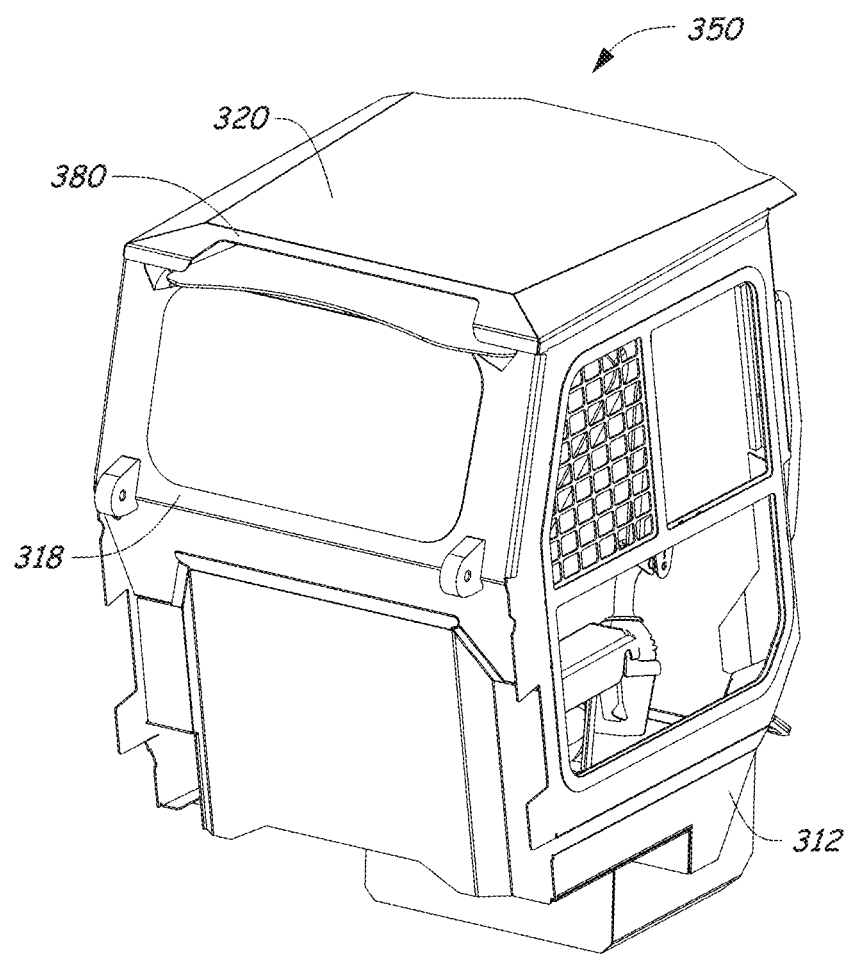
FIG. 7 is a rear perspective view illustration of the cab shown in FIG. 4 showing a door opening in the rear of the operator compartment according to some illustrative embodiments.

As noted above, with door 324 in the raised position shown in FIGS. 6 and 6A, the door is positioned at least partially interior to the cab, below roof or cab top 320 and above a seated operator's head. To accommodate door 324 within cab 350, in some embodiments, cab 350 includes an opening, at the rear of the cab, through which a portion of the door can extend when in the fully opened or raised position. For example, referring now to FIG. 7, shown is a rear view of cab 350 illustrating an opening 380 in the rear frame portion 318 of the cab. Opening 380 can also be formed between rear frame portion 318 and cab top 320. In some embodiments, to accommodate a taller door needed to provide a taller cab opening 326, four-bar linkage 330 is configured to move door 324 to a position which extends the top of the door through opening 380 when the door is fully raised.

Figure 8:
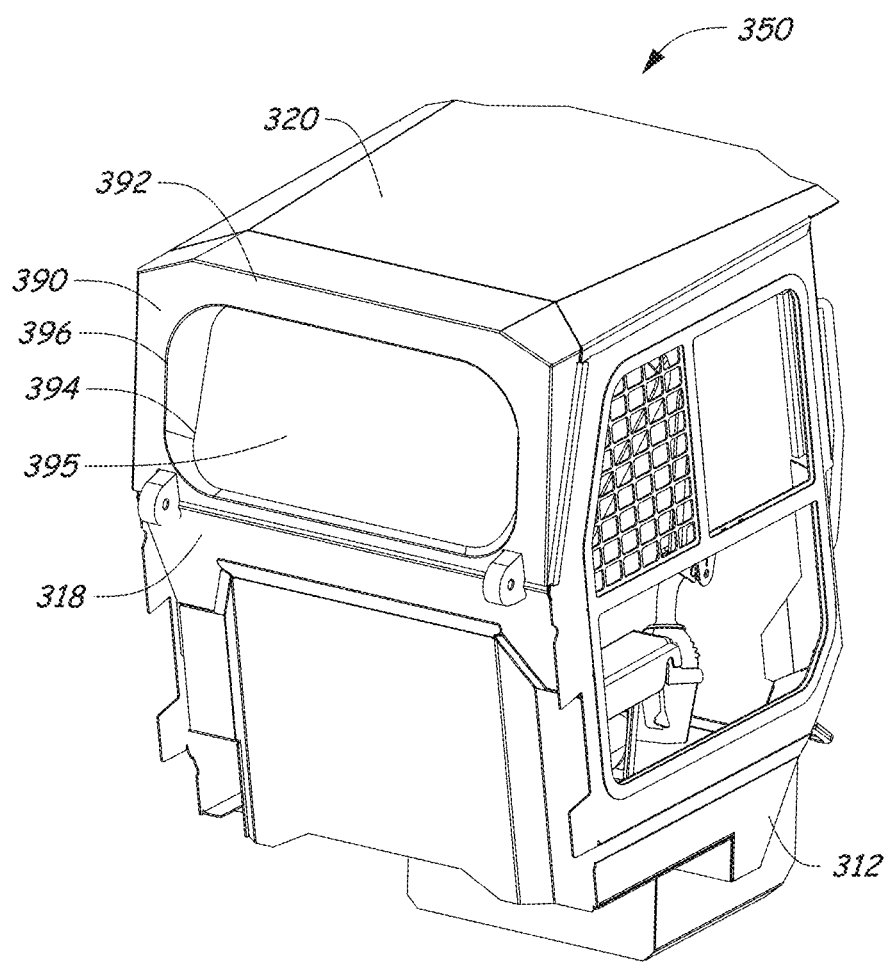
FIG. 8 is a rear perspective view illustration of the cab shown in FIG. 7 showing a cover for the door opening in the rear of the operator compartment.
Figure 9:
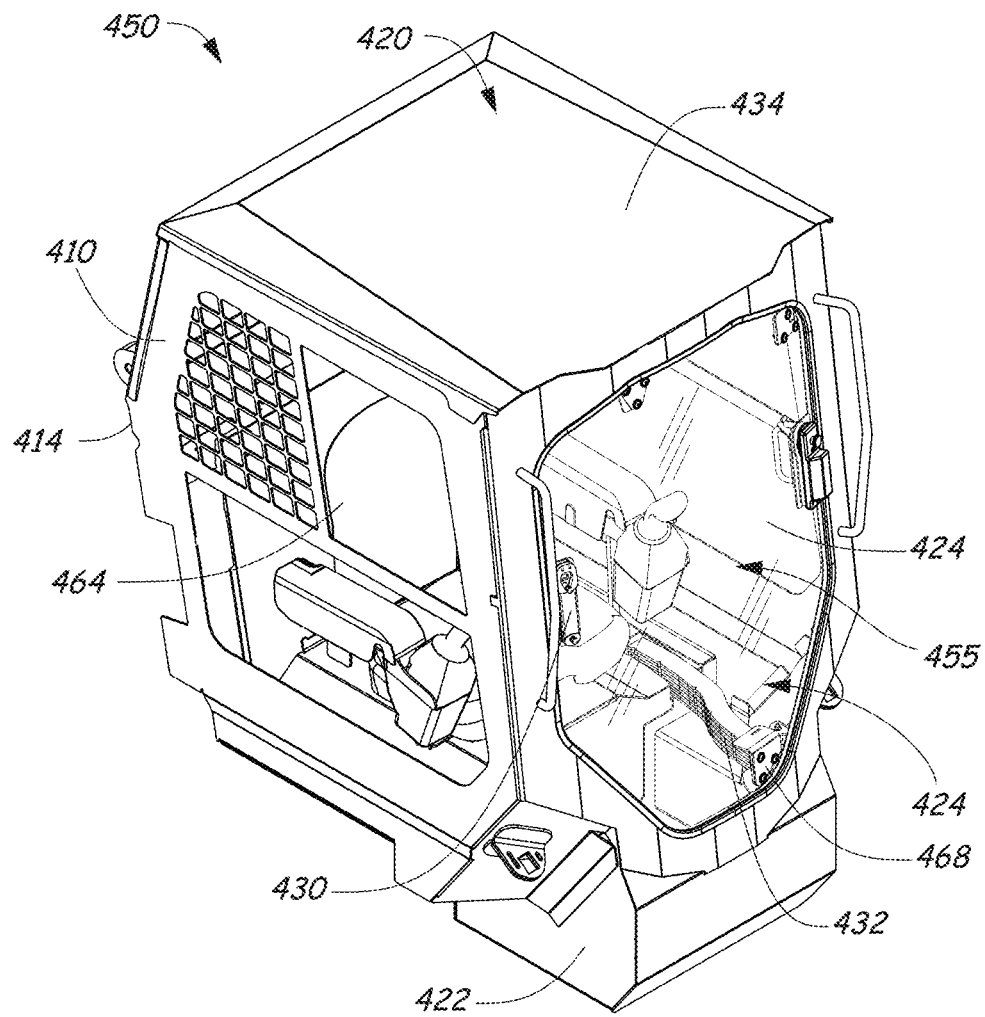
FIG. 9 is a perspective view illustration of a cab with a door in a closed position and moveable between the closed position and an open position along top and bottom tracks according to another illustrative embodiment.
Figure 10:
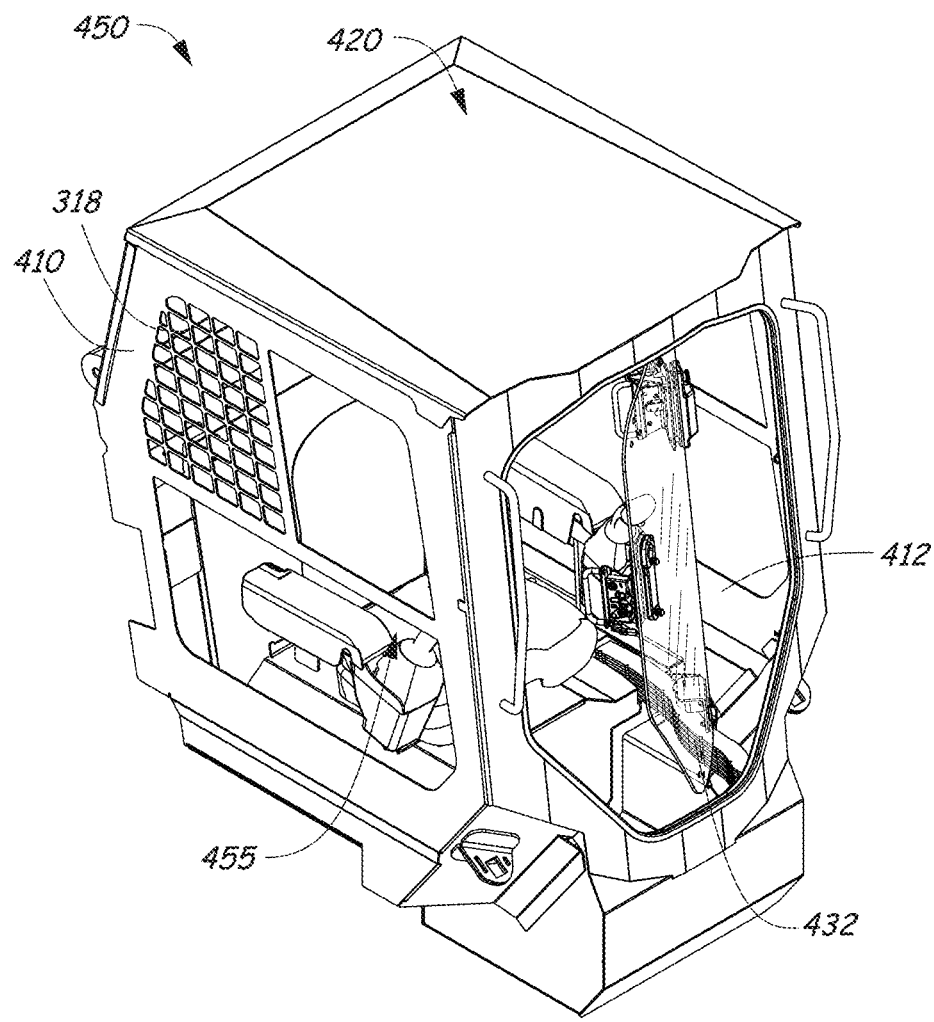
FIG. 10 is a perspective view illustration of the cab of FIG. 9 showing the door in a partially open position.
Figure 11:
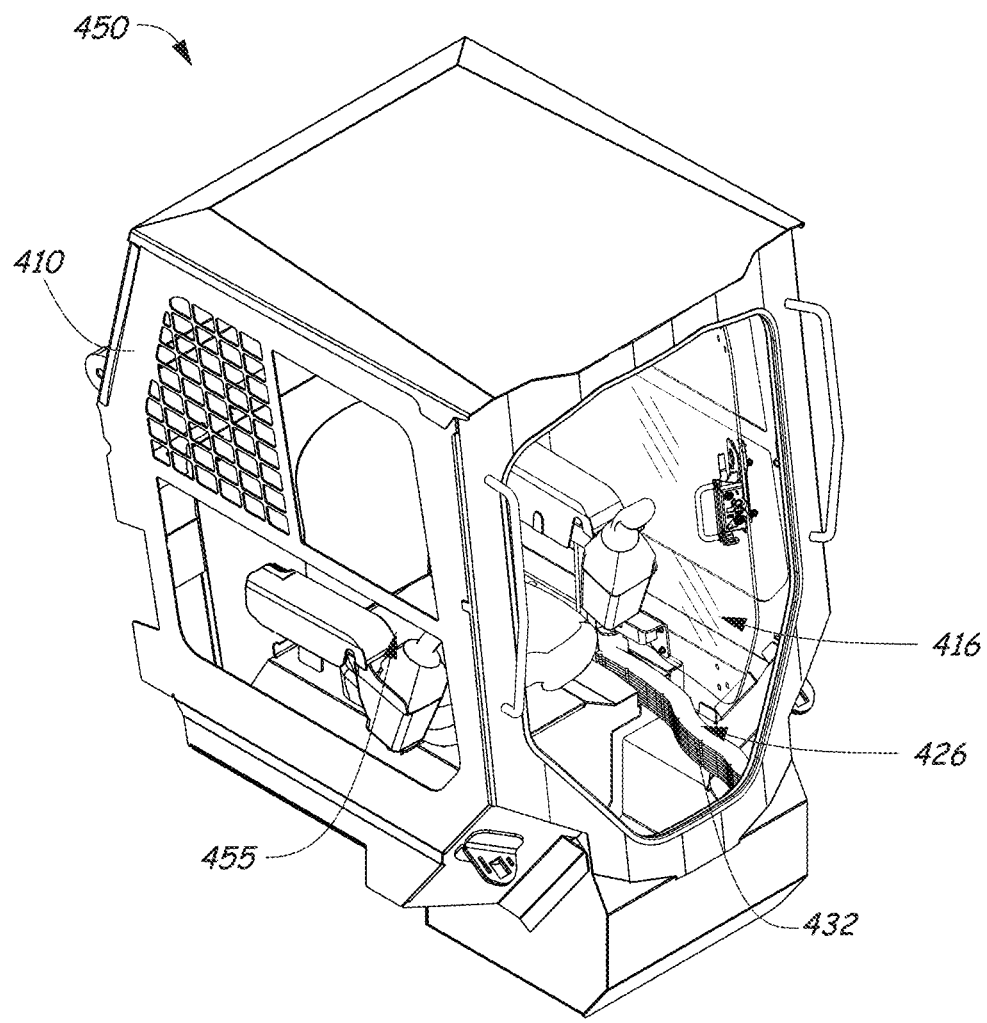
FIG. 11 is a perspective view illustration of the cab of FIG. 9 showing the door in the opened position.

A cover 390, shown in FIG. 8, can be welded or otherwise fixedly attached to rear frame portion 318 to cover opening 380, for example in order to enclose the operator compartment, in order to separate the door from a tailpipe of the power machine, or for other reasons. Cover 390 includes an upper horizontally extending channel 392 which covers opening 380. When the top of the door 324 extends through opening 380, the top of the door also extends into channel 392 of cover 390. In some embodiments cover 390 includes an additional feature to aid in maintaining or improving visibility for the operator. As shown in FIG. 8, cover 390 includes a flared opening 396 which tapers outward from a perimeter 394 of a rear window 395 of the cab. This prevents cover 390 from obstructing the operator's view through the rear window. Although shown as a separate piece, in some embodiments, cover 390 can be integrated into the cab frame.

FIGS. 9-14 illustrate a cab 450 or portions of cab 450 that can be coupled to the frame of a power machine with a door 424 that is moveable between an open and closed position according to another illustrative embodiment. The door 424 is shown in the closed position in FIG. 9, in a partially open position in FIG. 10, and in a fully opened position in FIG. 11. Like the door 324 discussed above, door 424 moves from the closed position to the opened position primarily within the cab. Unlike the door 324, however, door 424 moves laterally rather than to a position above an operator when moving from the closed position to the open position.

Cab 450 defines an operator compartment 455 from which an operator can operate a power machine. The cab 450 has a frame 410 that includes sides 412 and 414, top 420 and back 418. A lower portion 422 is provided for space for an operator to place feet during operation of the power machine. The cab 450 has an opening 426 through which an operator can enter or exit the operator compartment 455 when the door 424 is in the open position. When the door 424 is in the closed position, the door will cover all or substantially all of the opening 426.

In the embodiment shown in FIGS. 9-14, the door has a plurality of hangers 460, 462, and 468 that are mounted at or near edges of the door. The hangers 460, 462, and 468 are configured to engage the frame 410 so that the door is attached to the frame 410. In addition, the hangers have features, described below, that allow the door to move relative to the frame 410 while at the same time remaining attached to the frame. In the embodiments shown and discussed herein, three hangers are disclosed. In other embodiments, a different number of hangers may be used to movably attached the door to the frame. As shown, hangers 460 and 462 are mounted along a top edge of the door 424, while hanger 468 is mounted along a bottom edge of the door. Hangers 460 462 engage with a top door mounting structure 434 and a bottom mounting structure 432 to movably mount the door to the frame 410. The door 424 includes a pair of handle assemblies 430 that include latching mechanisms and handles on each side of the door (i.e. the left and right sides of the door). The handle assemblies 430 are operable from inside and outside of the cab 450 to open and close the door 424.

Figure 12:
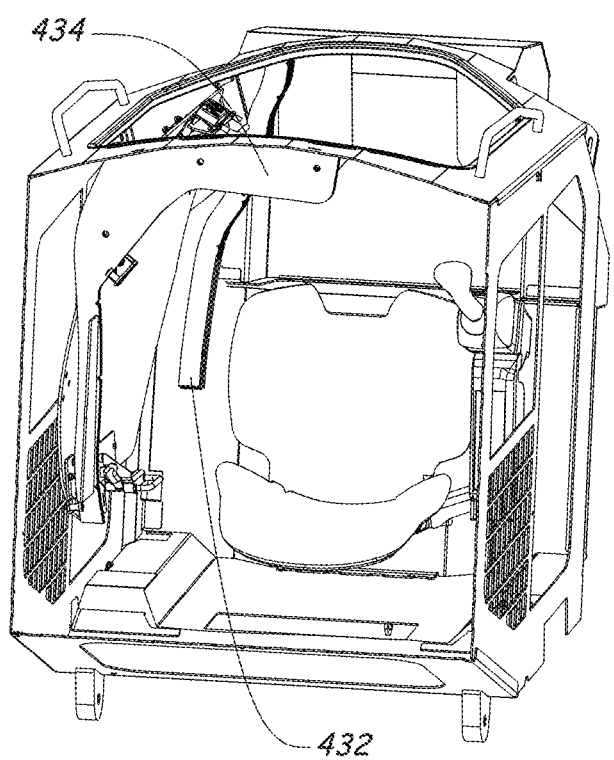
FIG. 12 is a perspective view illustration from a top of the cab of FIG. 9 with the roof of the cab removed to show the bottom track that the door engages as it moves between the top track according to one illustrative embodiment.
Figure 13:
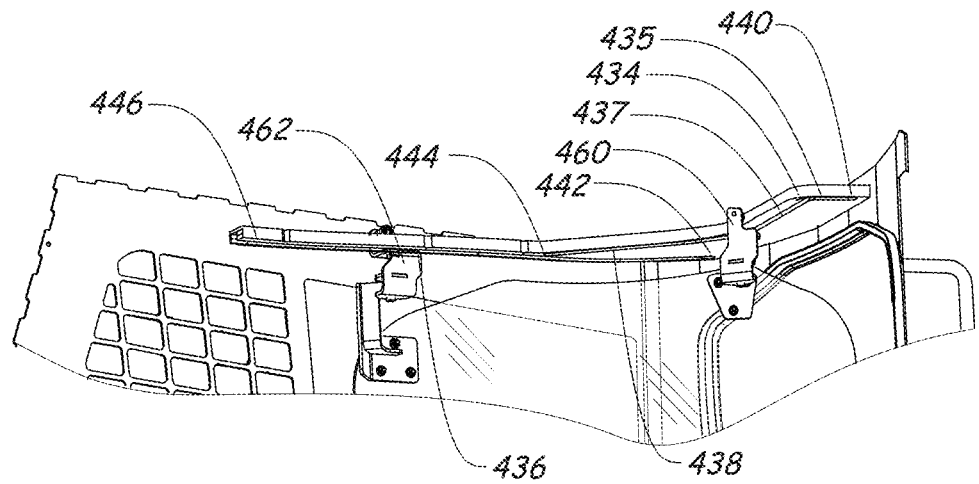
FIG. 13 is a perspective view illustration from a lower view illustrating the top track of the cab of FIG. 9 according to one illustrative embodiment.

FIGS. 12-13 illustrate top door mounting structure 434 and bottom mounting structure 432 in more detail. Each of the top door mounting structure 434 and the bottom door mounting structures have channels that are provided for engagement with the hangers. The channels collectively define a path of movement for the door 424 between the open and closed positions. In some embodiments, at least one of the top door mounting structure and the bottom door mounting structure has a plurality of channels. For example, the top door mounting structure 434 has a first channel 436 and a second channel 438. The first channel 436 extends between a front position 442 and a back position 446. The second channel 438 extends between a front position 440 and a back position 444. As seen in FIG. 13, the hanger 462 engages first channel 436. As hanger 462 is located near the left-hand side—from the perspective of an operator sitting in the seat—and the door 424 is positioned on the left-hand side of the operator compartment, the first channel 436 extends generally in a front to back direction. Hanger 460 is positioned generally toward the right-hand side of the door 424 in the closed position and generally on the left-hand side when in the opened position. Hanger 460 engages the second channel 438. The second channel 438 has a portion 437 that moves the hanger 460 leftward and then back. The second channel 438 also has a portion 435 near the front position 440 that moves from front to back so that the door, when moving from the closed position to the open position is first drawn back into the cab a distance before it is moved leftward.

Figure 14:
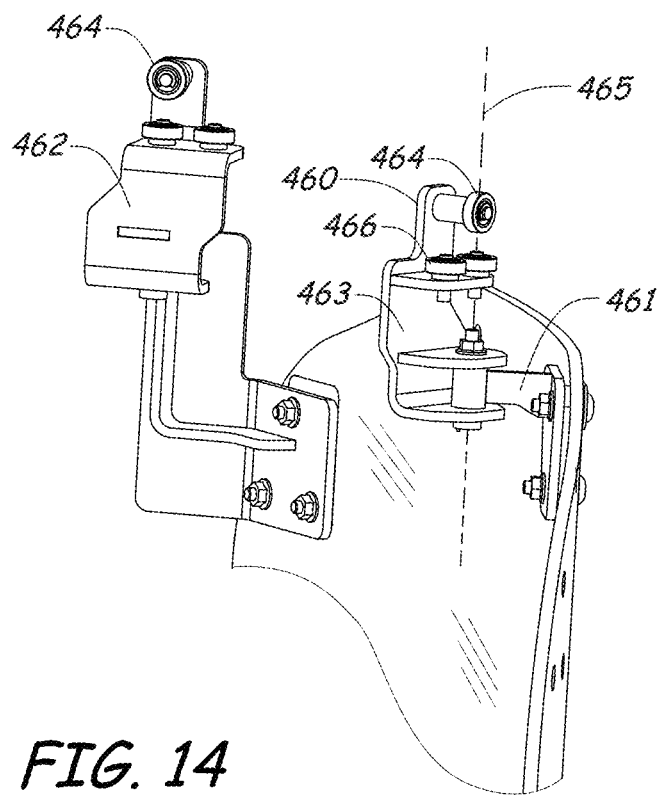
FIG. 14 is a view of track runners on a top edge of the door that engage the top track of the cab of FIG. 9 according to one illustrative embodiment.

FIG. 14 illustrates hangers 460 and 462 in more detail according to one illustrative embodiment. Hangers 460 and 462 are representative of hangers generally. The hangers 460 and 462 each have a main structure 461 and 463, respectively and a plurality of rollers. The main structures each includes fastening mechanisms such as screws or bolts to attach the hanger to the door 424. The main structures 461 and 463 also position rollers to engage the channels 436 and 438 and are not identical because the positioning needs of the rollers of hangers 460 and 462 are not identical. In various embodiments, the rollers can have various positioning. In the embodiment shown, hangers 460 and 462 each have a pair of generally horizontally positioned rollers 466 and a vertically oriented roller 464. The horizontally positioned rollers 466 are intended to be positioned within the channels and the vertically oriented roller 464 is intended to be positioned on top of the top door mounting structure 434. The door 424, then, hangs from the vertically oriented rollers 464.

Figure 15:
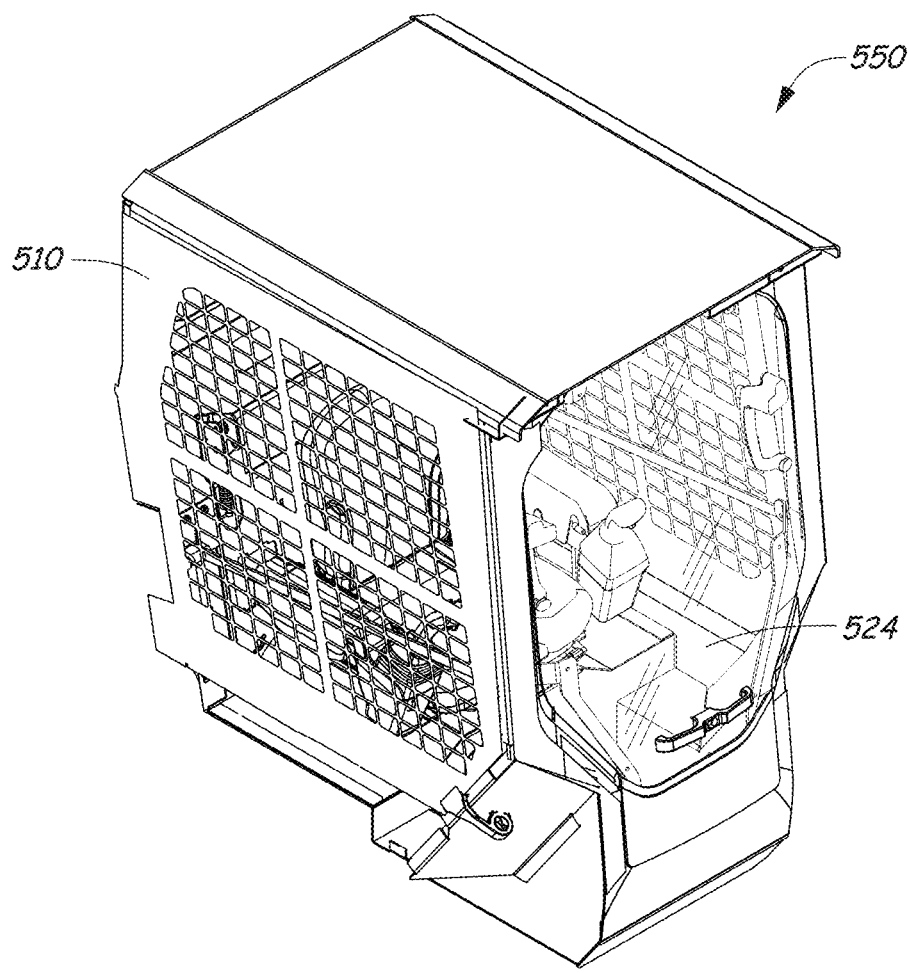
FIG. 15 is a perspective view illustration of a cab with a door in a closed position and moveable between the closed position and an open position by rotating upward and downward inside the cab according to another illustrative embodiment.
Figure 16:
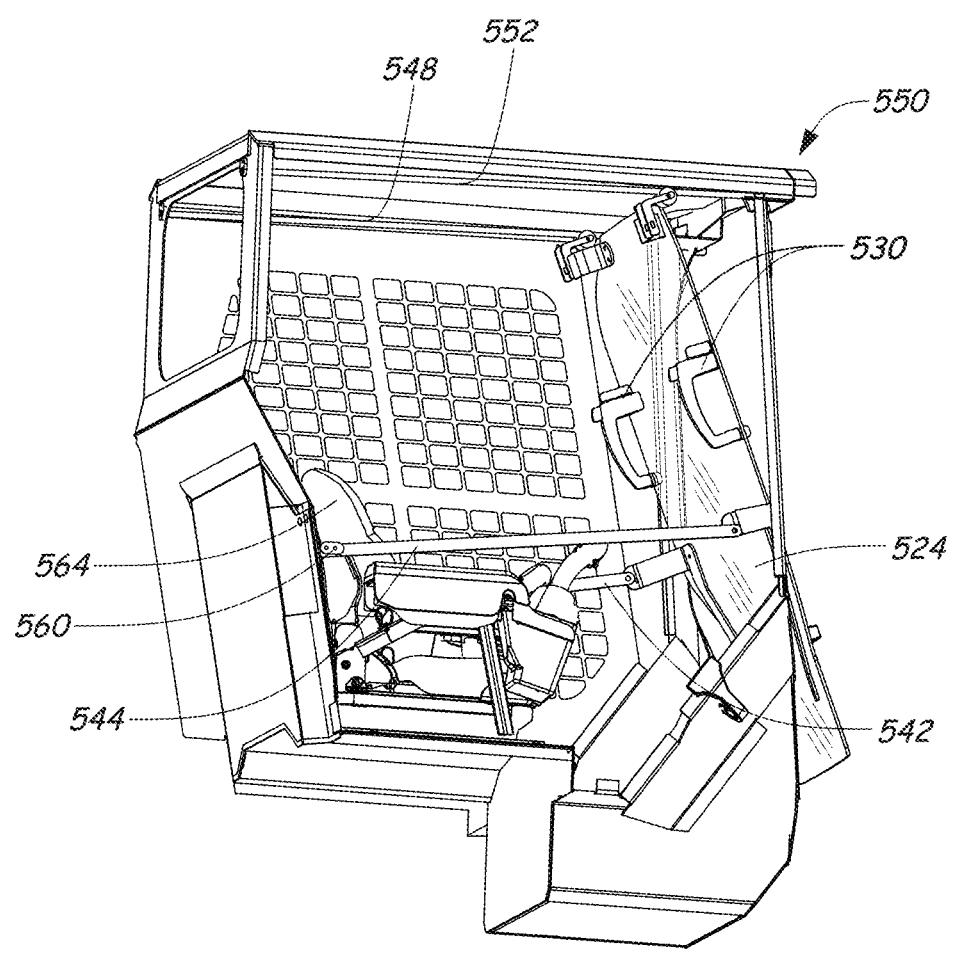
FIG. 16 is a perspective view illustration of the cab of FIG. 15 with a right side of the cab frame removed to show the door in a partially open position.
Figure 17:
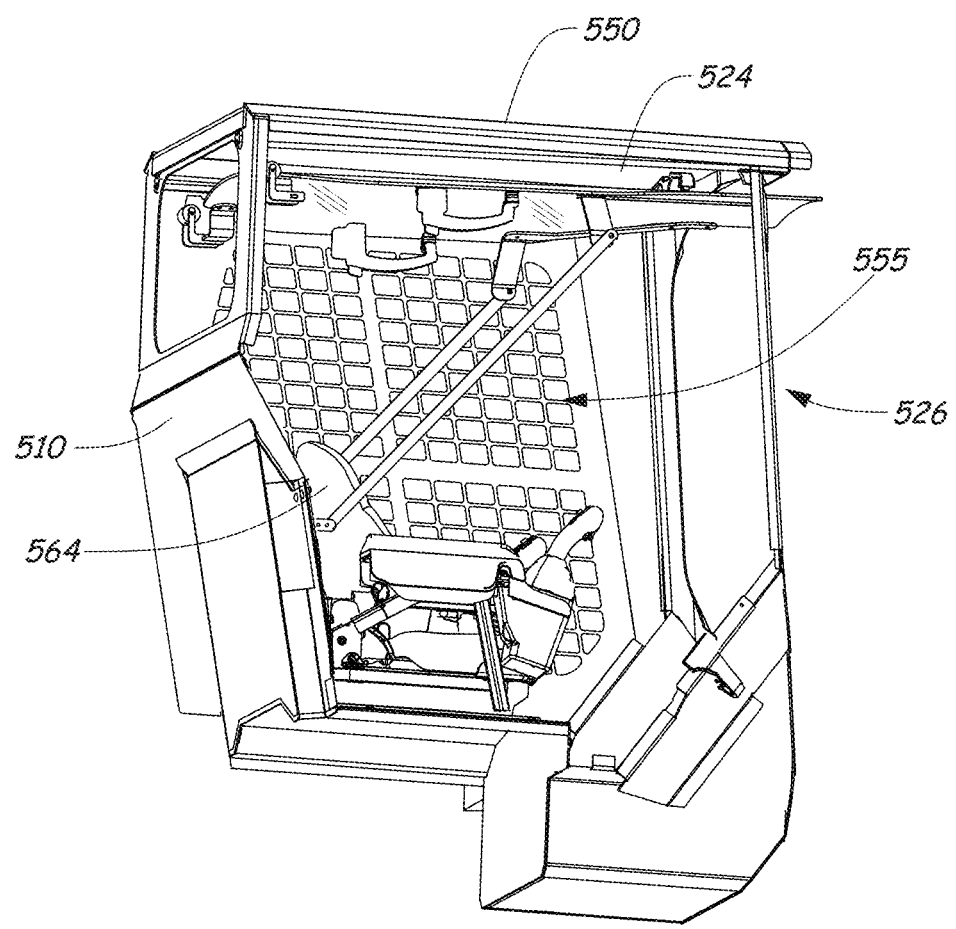
FIG. 17 is a perspective view illustration of the cab of FIG. 15 with the right side of the cab frame removed to show the door in the opened position.
Figure 18:
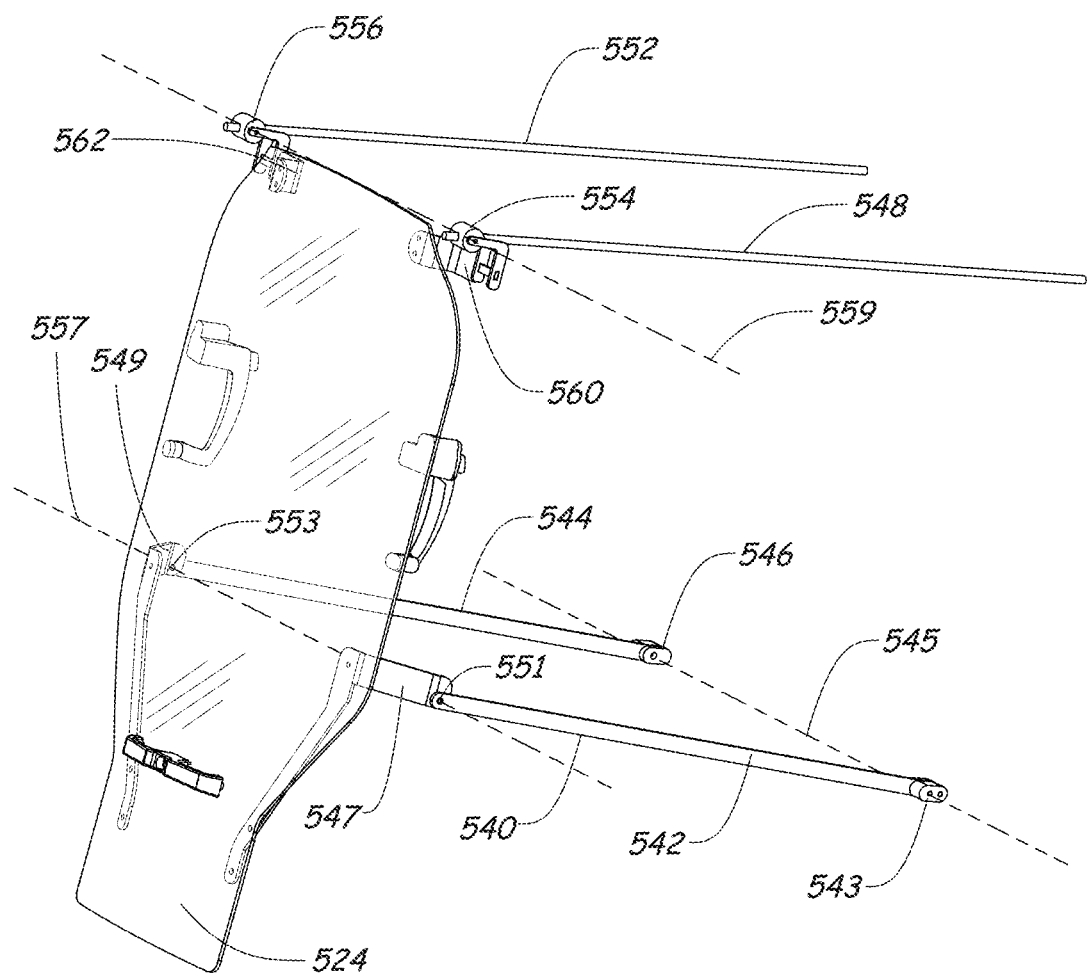
FIG. 18 is a perspective view of the door of the cab shown in FIG. 15 along with linkage and supports that are provided to attach the door to the cab according to one illustrative embodiment.

FIGS. 15-17 illustrate a cab 550 that can be coupled to the frame of a power machine with a door 524 that is moveable between an open and closed position according to another illustrative embodiment. Cab 550 is similar to the cabs 350 and 450 discussed above and has a frame 510 which defines, at least in part, an operator compartment 550. Door 524 is configured to move between a closed position, as shown in FIG. 15 and an opened position, as shown in FIG. 17. In the closed position door 524 covers an opening 526 (shown in FIG. 17). FIG. 16 shows door 524 in a partially opened position. Like door 324, when door 524 is in the opened position, the door is positioned above the operator seat 564 and inside the cab structure. Door 524, however, discloses a different linkage structure from that of door 324. FIG. 18 illustrates a perspective view of door 524 and linkage 540. Linkage 540 includes a first link 542 and a second link 544. First link 542 is mounted to the door 524 via a bracket 547 on one end 551 and to the cab frame at another end 543. Similarly, second link 544 is mounted to the door 524 on one end 553 via a bracket 549 and to the cab frame on another end 546. The door is capable of pivoting about the links 542 and 544 at each of their respective ends (and about axes 545 and 557) to move the door between the opened and closed positions.

Also shown in FIG. 18 are a pair of supports 548 and 552 that are mounted to the cab 550 (not shown in FIG. 18) and are operably coupled to the door 524. The supports as shown in this embodiment are cylindrical rods (although in other embodiments, other types and shapes of supports can be used) that extend along a top of the cab. A pair of mounts 554 and 556 are slidably mounted to the supports 548 and 552, respectively. The mounts 554 and 556 are pivotally mounted to brackets 560 and 562 and each pivotable with respect to their respective brackets along axis 559 as the door moves between the opened and closed positions.

Figure 19:
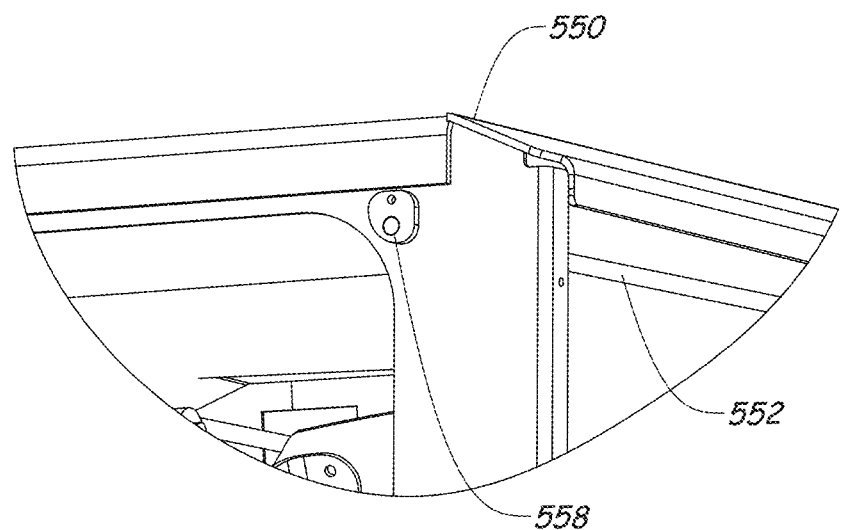
FIG. 19 is view of a portion of the cab of FIG. 15, showing an attachment the supports of FIG. 18 to the cab according to one illustrative embodiment.

FIG. 19 illustrates an upper rear corner of the cab 550 illustrating how support 552 is mounted to the cab, according to one illustrative embodiment. Support 552 extends through an aperture (not shown) in the cab 550 and is attached to the cab via mounting hardware 558. Any suitable hardware can be used, including those that are welded or otherwise permanently fixed to the cab. Support 552 is also attached a front of the cab using any suitable means (not shown).

Figure 20:
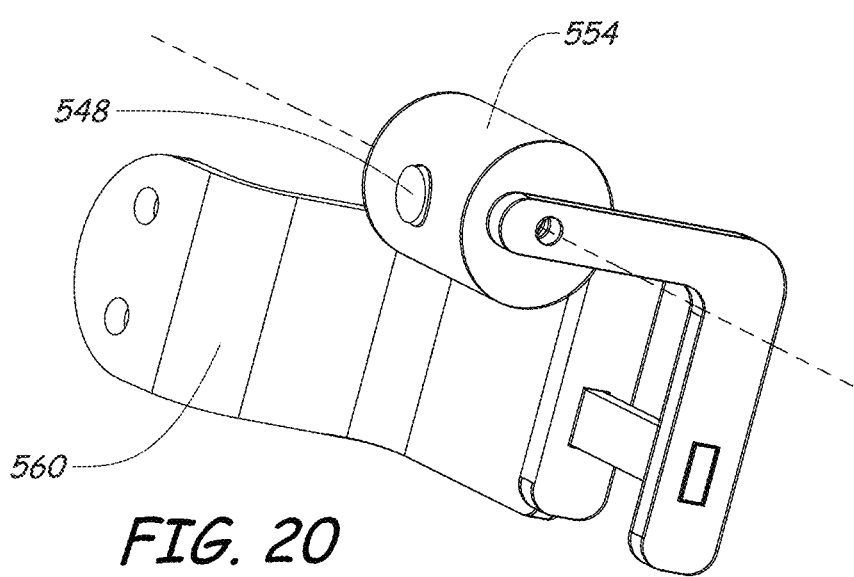
FIG. 20 illustrates a mounting bracket for attaching a door to supports that extend from front to back in a cab as illustrated in FIG. 15 according to one illustrative embodiment.

FIG. 20 illustrates bracket 560 in more detail. Mount 554 is pivotally mounted to the bracket 560 and support 548 extends through mount 554. Mount 554 is shown as having a generally cylindrical shape in this embodiment, but in other embodiments can have other shapes. The bracket 560 is configured to be attached to the door and is shaped to properly position the mount 554.

Figure 21:
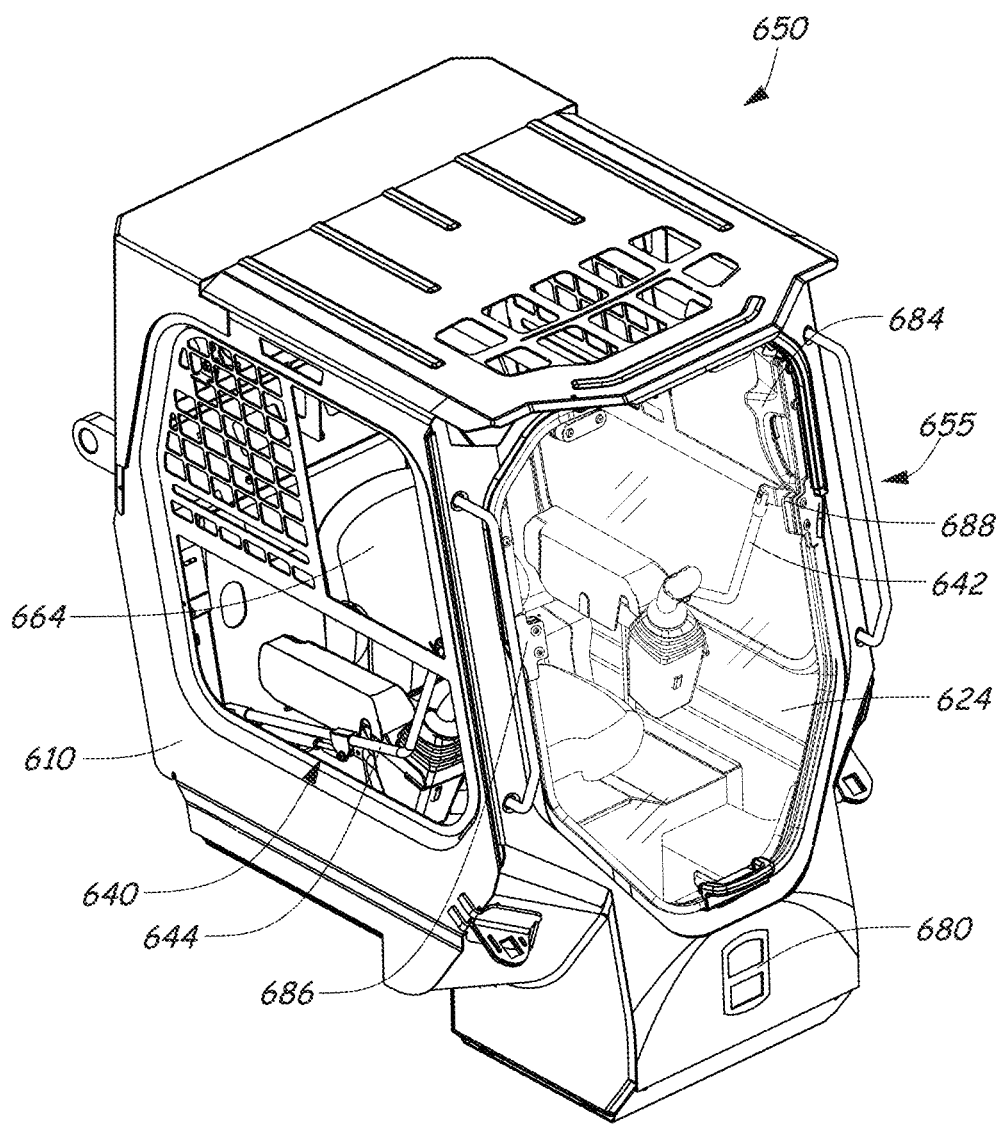
FIG. 21 is a perspective view illustration of a cab with a door in a closed position and moveable between the closed position and an open position by rotating upward and downward inside the cab according to another illustrative embodiment.
Figure 22:
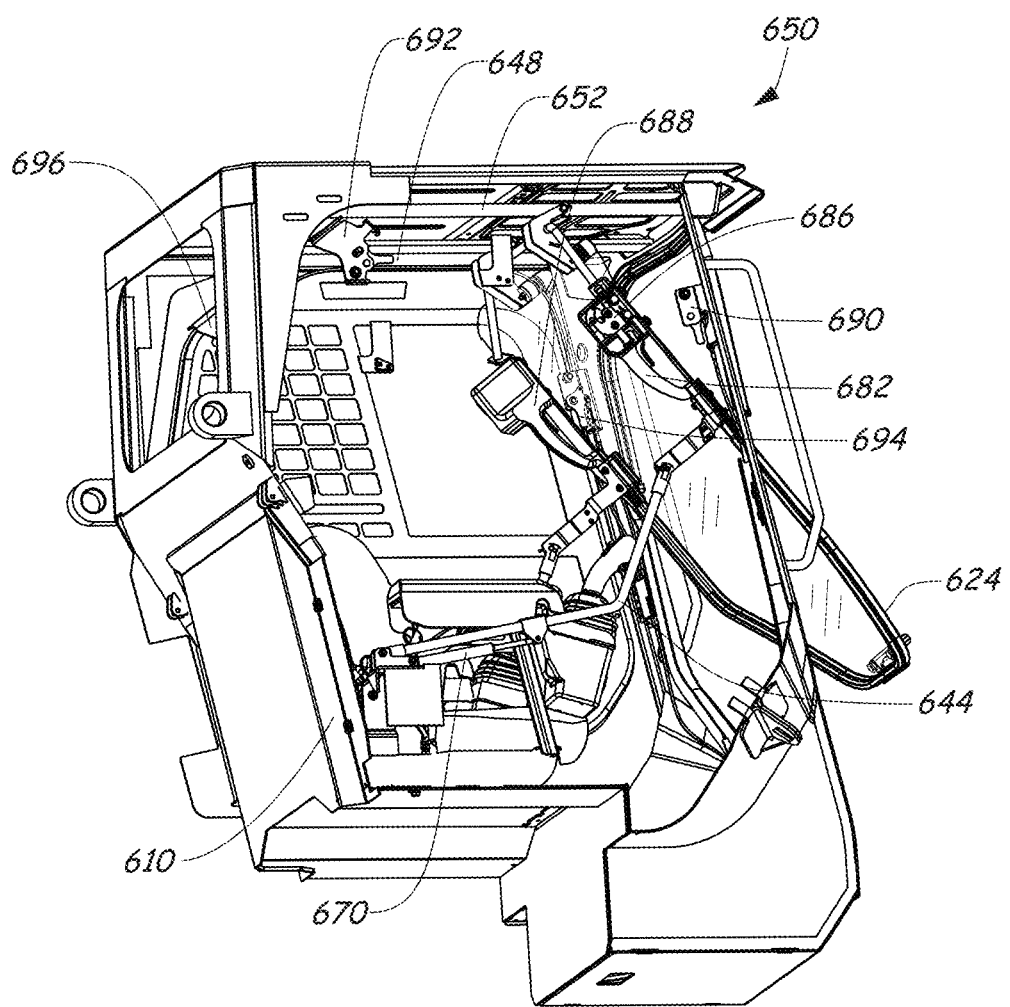
FIG. 22 is a perspective view illustration of the cab of FIG. 21 with a right side of the cab frame removed to show the door in a partially open position.
Figure 23:
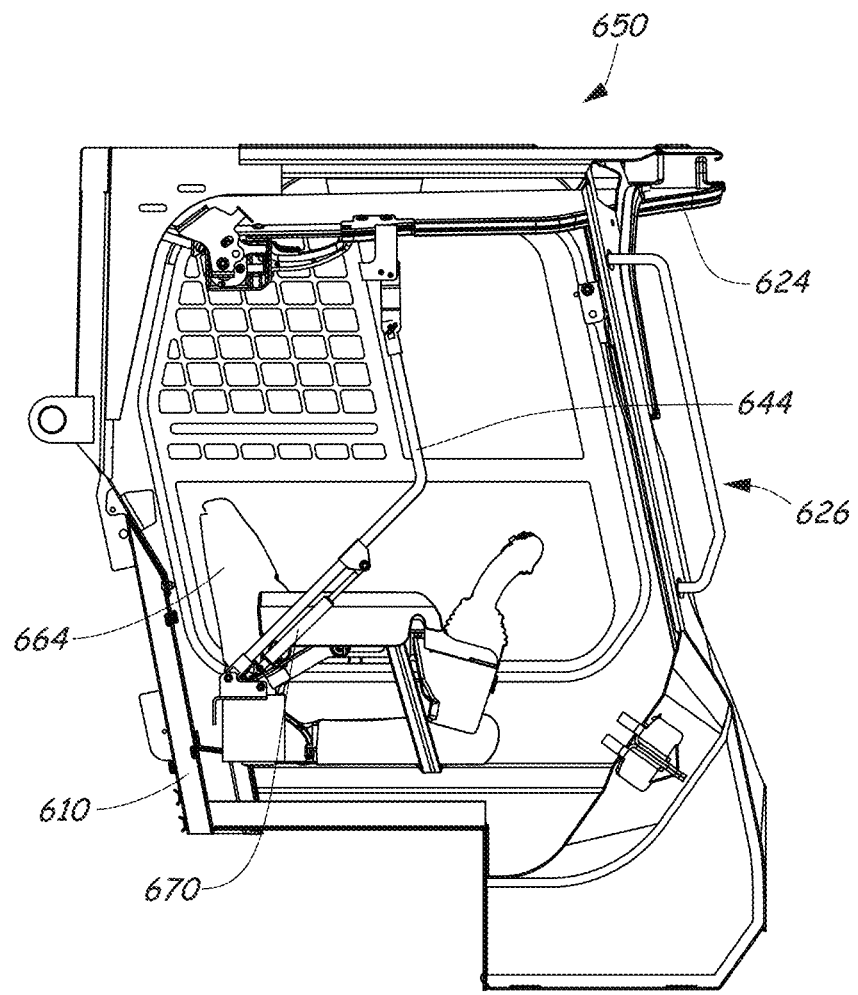
FIG. 23 is a side view illustration of the cab of FIG. 21 with the right side of the cab frame removed to show the door in the opened position.
Figure 24:
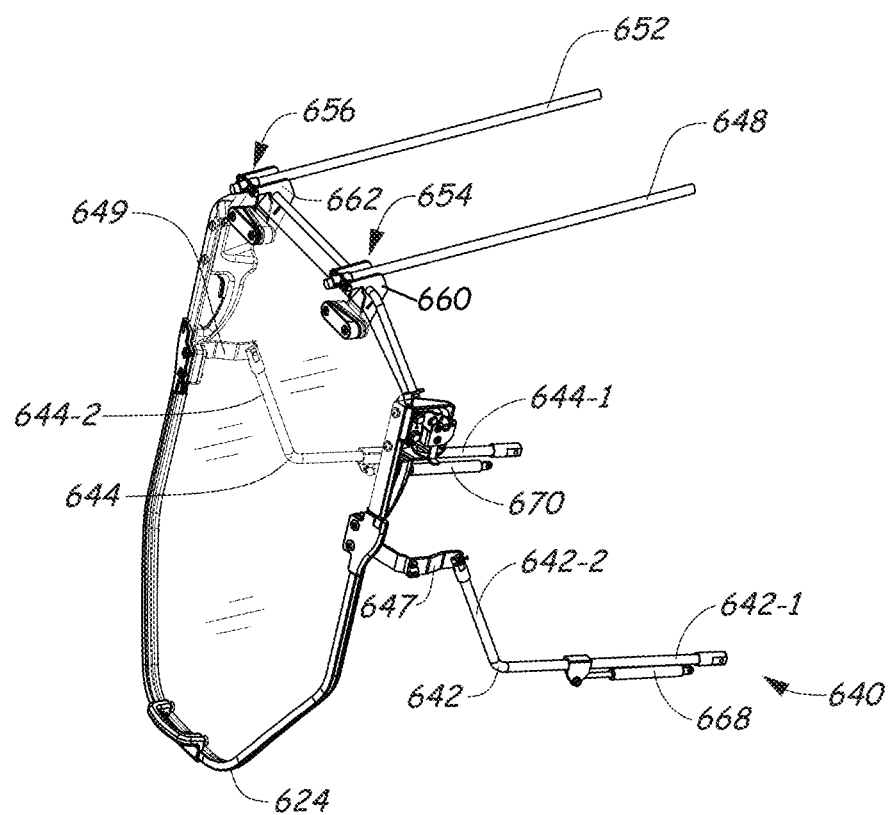
FIG. 24 is a perspective view of the door of the cab shown in FIG. 21 along with linkage and supports that are provided to attach the door to the cab according to one illustrative embodiment.

FIGS. 21-23 illustrate a cab 650 that can be coupled to the frame of a power machine with a door 624 that is moveable between an open and closed position according to another illustrative embodiment. Cab 650 is similar to the cabs 350, 450 and 550 discussed above and has a frame 610 which defines, at least in part, an operator compartment 655. Door 624 is configured to move between a closed position, as shown in FIG. 21 and an opened position, as shown in FIG. 23. In the closed position door 624 covers an opening 626 (shown in FIG. 23). FIG. 22 shows door 624 in a partially opened position. Like doors 324 and 524, when door 624 is in the opened position, the door is positioned above the operator seat 664 and inside the cab structure. Door 624, however, utilizes a different linkage structure from that of doors 324 and 524. FIG. 24 illustrates a perspective view of door 624 and linkage 640. Linkage 640 includes a first link 642 and a second link 644. First link 642 is mounted to the door 624 via a bracket 647 on one end and to the cab frame 610 at another end. Similarly, second link 644 is mounted to the door 624 on one end via a bracket 649 and to the cab frame on another end. The door is configured to pivot about the links 642 and 644 at each of their respective ends to move the door between the opened and closed positions.

In an exemplary embodiment, first link 642 includes a first link section 642-1 and a second link section 642-2 rigidly connected to one another, or continuously formed, such that the first and second link sections of the first link do not pivot relative to each other. The first and second link sections of the first link are oriented at an angle relative to one another such that the first link is not straight between the distal ends of the two link sections. By not utilizing a straight link, visibility for an operator of the power machine can be improved. Similar to first link 642, second link 644 includes a first link section 644-1 and a second link section 644-2 disposed at an angle relative to one another.

Also shown in FIG. 24 are a pair of supports 648 and 652 that are mounted to the frame of the cab 650 (not shown in FIG. 24) and are operably coupled to the door 624. The supports as shown in this embodiment are cylindrical rods (although in other embodiments, other types and shapes of supports can be used) that extend along a top of the cab. A pair of mounts 654 and 656 are slidably mounted to the supports 648 and 652, respectively. The mounts 654 and 656 are pivotally mounted to brackets 660 and 662 and each is pivotable with respect to their respective brackets as the door moves between the opened and closed positions.

Figure 25:
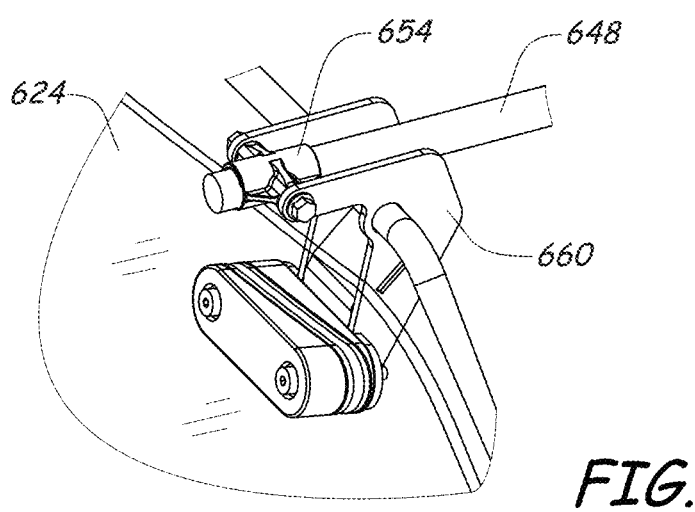
FIG. 25 illustrates a mounting bracket for attaching a door to supports that extend from front to back in a cab as illustrated in FIG. 21 according to one illustrative embodiment.

FIG. 25 illustrates bracket mount 654 and bracket 660 in more detail. Mount 654 is pivotally mounted to the bracket 660, and support 648 extends through mount 654. Mount 654 can have a generally cylindrical or tubular shape which allows it to slide over a rod-shaped support 648. However, in other embodiments, mounts 654 and 656, as well as supports 648 and 652, can have other shapes. The bracket 660 is configured to be attached to the door 624 and is shaped to properly position the mount 654.

Referring back to FIGS. 21 and 22, shown are operator input device 680 operable from outside of the cab and handles 682 and 684, each having operator input devices operable from inside of the cab. A first latch 686 is positioned on a first side of the cab door 624, and a second latch 688 is positioned on a second side of the cab door. As will be described in greater detail with reference to FIGS. 26-30, a first complementary mechanism 690 is coupled to the cab frame and configured to engage the first latch 686 when the cab door is in the closed position (e.g., the position of FIG. 21), and a second complementary mechanism 692 is coupled to the cab frame and configured to engage the first latch 686 when the cab door in in the open position (e.g., the position of FIG. 23). Similarly, a third complimentary mechanism 694 is coupled to the cab frame and configured to engage the second latch 688 when the cab door is in the closed position, and a fourth complementary mechanism 696 is coupled to the cab frame and configured to engage the second latch 688 when the cab door in in the open position.

Figure 26:
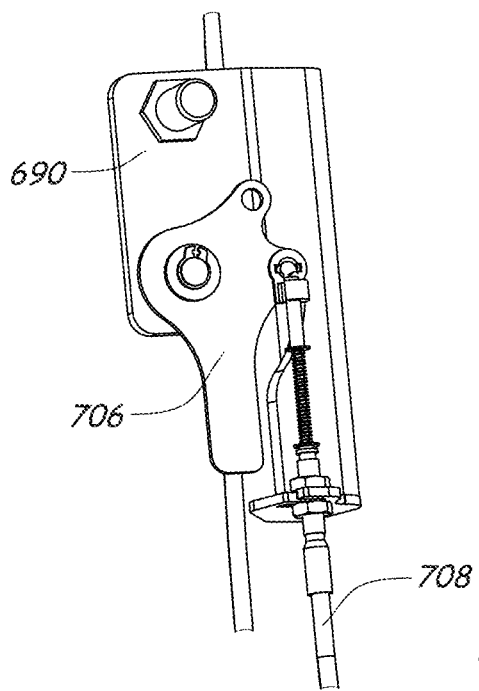
FIGS. 26-30 illustrate door latches, complimentary features on the cab frame which engage the door latches, and latch release mechanisms in accordance with one illustrative embodiment.
Figure 27:
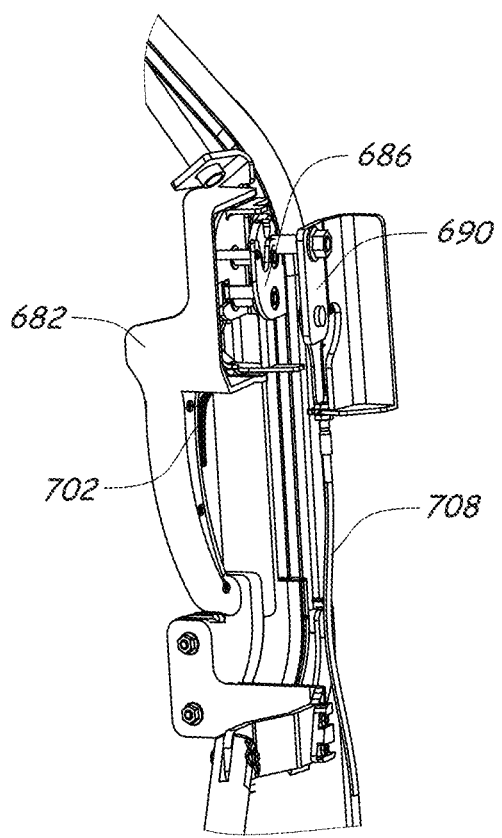
Figure 28:
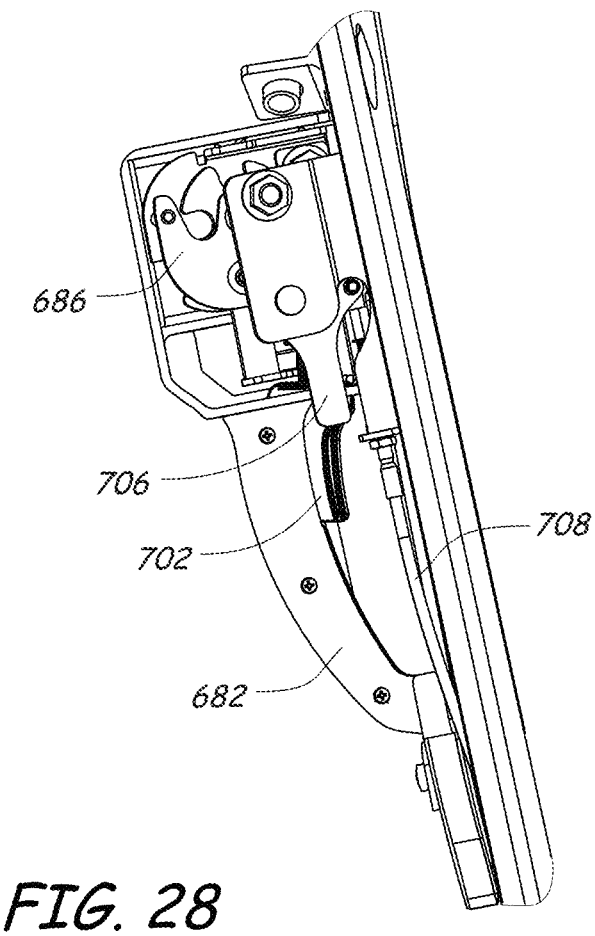

As shown for example in FIG. 22, cab door 624 also includes a first handle 682 and a second handle 684 on an interior of the door, positioned respectively near the first latch 686 and the second latch 688. Each of the handles 682 and 684 has an operator input 702 (shown for handle 682 in FIGS. 27 and 28) which is configured to release two latch release mechanisms. For instance, FIG. 26 illustrates first complimentary mechanism 690 configured to engage the first latch 686 when the cab door is in the closed position. A first latch release mechanism 706 is positioned adjacent the first complementary mechanism 690 and is configured to release the first latch 686 from engagement with the first complementary mechanism. First latch release mechanism 706 can be actuated through a push-pull cable 708. FIGS. 27 and 28 illustrate first latch 686, first complimentary mechanism 690 and first latch release mechanism 706 in relation to handle 682 and operator input 702. Actuation of operator input 702 causes first latch release mechanism 706 to release the first latch 686 from engagement with first complimentary mechanism 690, allowing the door to be moved. In response, push-pull cable 708 also actuates a second latch release mechanism 710 (shown in FIGS. 29 and 30).

Figure 29:
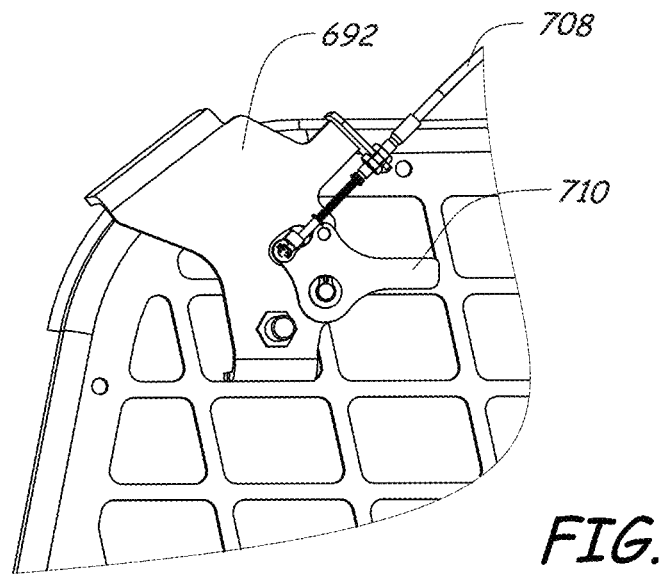
Figure 30:
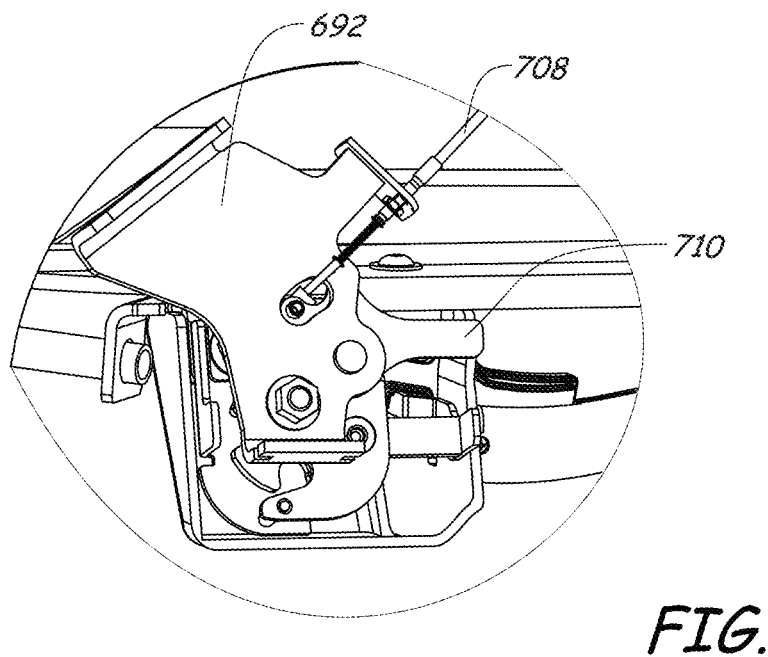

As shown in FIGS. 29 and 30, a second latch release mechanism 710 is positioned adjacent the second complementary mechanism 692 which engages the first latch 686 when the cab door in in the open position. In an exemplary embodiment, the second complementary mechanism 692 and second latch release mechanism 710 are positioned toward a rear of the cab. The second latch release mechanism 710 is configured to release the first latch 686 from engagement with the second complementary feature 692. As can be seen in FIGS. 29 and 30, second latch release mechanism 710 is coupled to and can be actuated by push-pull cable 708. As actuation of either of first latch release mechanism 706 or second latch release mechanism 710 by operator input 702 causes actuation of the other latch release mechanism due to their coupling by push-pull cable 708, actuation of a single operator input 702 causes actuation of both the first latch release mechanism 706 and the second latch release mechanism 710.

Figure 34:
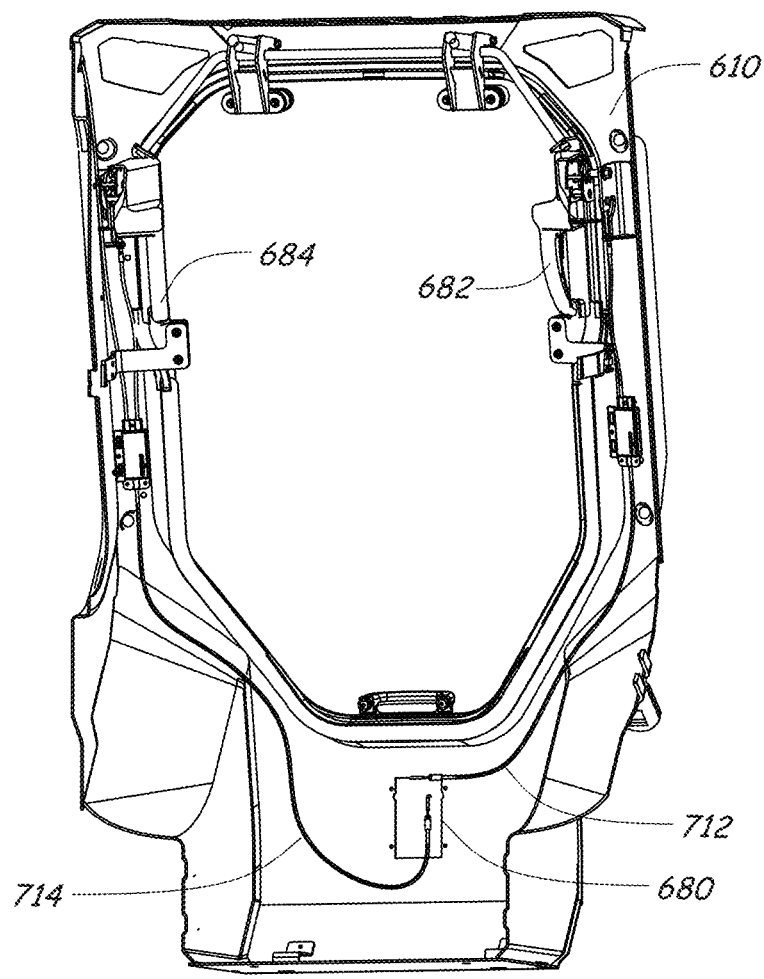
FIG. 34 illustrates an interior of a front portion of cab frame and a single operator input device configured to actuate the latch release mechanisms shown in FIGS. 26-30.

Although not separately illustrated or numbered, a third latch release mechanism (similar to latch release mechanism 706) is positioned adjacent the third complementary mechanism 694 and configured to release the second latch 688 from engagement with the third complementary feature, and a fourth latch release mechanism (similar to latch release mechanism 710) is positioned adjacent the fourth complementary mechanism 696 and configured to release the second latch 688 from engagement with the fourth complementary mechanism. Being coupled together by a second push-pull cable (similar to push-pull cable 708), the actuation of either of the third and fourth latch release mechanisms by a second operator input (similar to operator input 702) on handle 684 causes actuation of the other latch release mechanism. Thus, actuation of a single operator input on the handle 684 (or elsewhere in other embodiments) causes actuation of both the third latch release mechanism and the fourth latch release mechanism. In exemplary embodiments, single operator input device 680 (shown in FIG. 20) that is operable from outside of the cab is configured to actuate all of the first latch release mechanism, the second latch release mechanism, the third latch release mechanism, and the fourth latch release mechanism to release the first and second latches 686 and 688 from the corresponding complimentary mechanisms 690, 692, 694 and 696. As shown in the interior view of a front portion of cab frame 610 provided in FIG. 34, single operator input device 680 is coupled to the latch release mechanisms through a push-pull cable arrangement originating from push pull cables 712 and 714 connected to the single operator input device 680.

Figure 31:
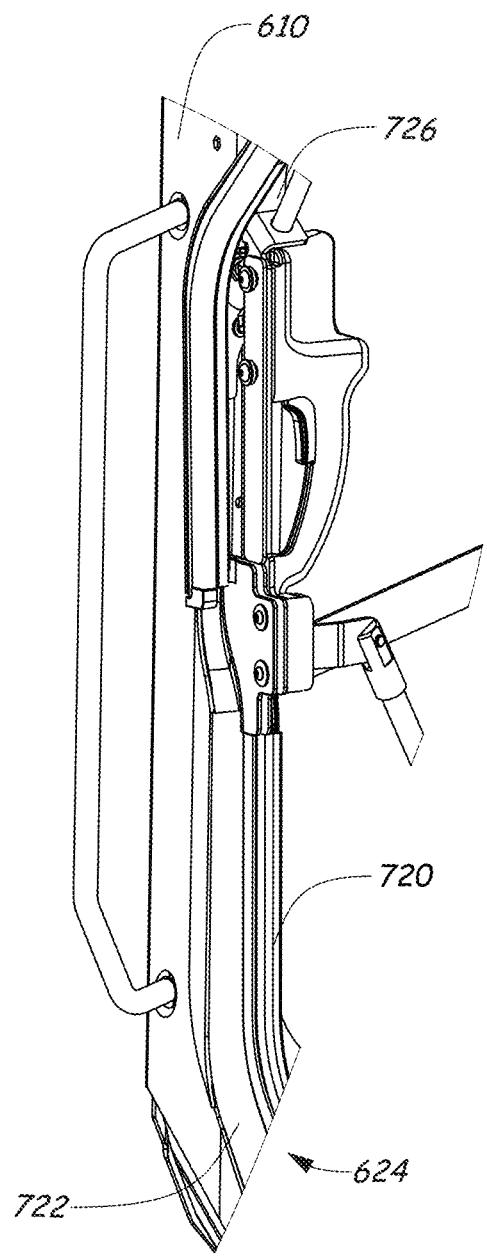
FIGS. 31-33 illustrate a door seal configuration in accordance with one illustrative embodiment.
Figure 32:
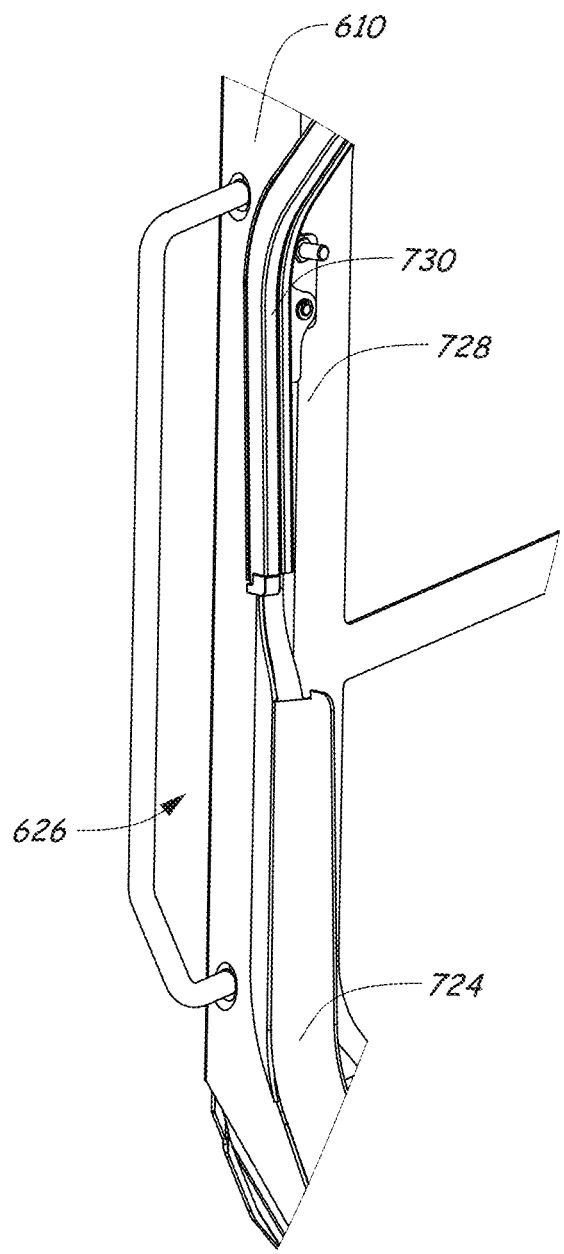
Figure 33:
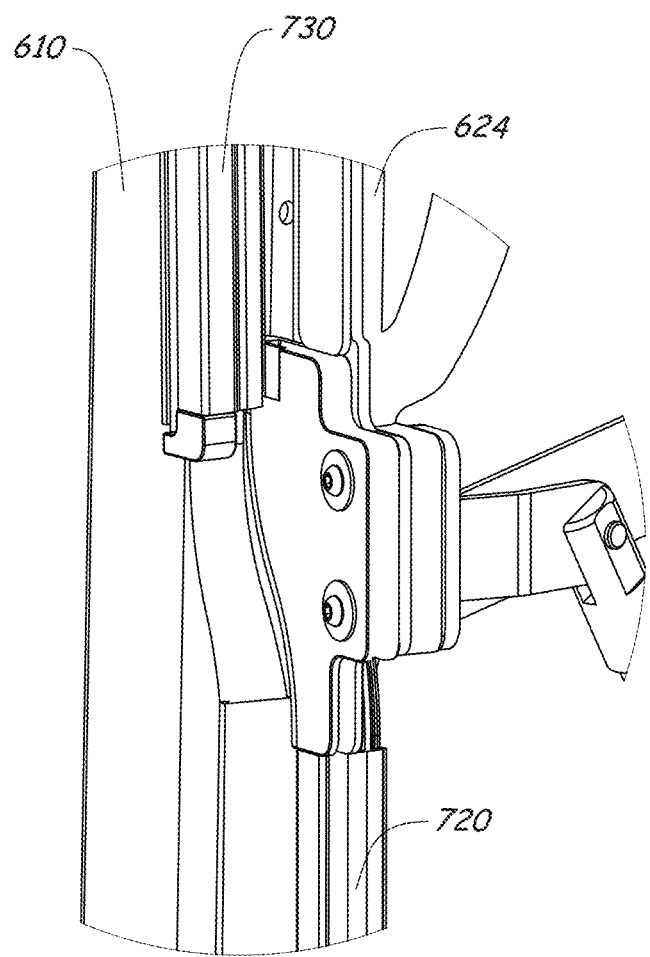

Referring now to FIGS. 31-33, shown is a portion of cab frame 610 defining an opening 626 and cab door 624 with a seal configuration. A shown, a first seal 720 is positioned on a first portion 722 of the cab door and configured to engage a first portion 724 of the cab frame when the door is in the closed position. In one exemplary embodiment, the first portion 722 of the cab door is a bottom portion of the cab door and the first portion 724 of the cab frame defines a bottom portion of the opening 626. The first portion 724 of the cab frame defining the bottom portion can be a lip (as shown in FIG. 32) that the door seal engages when the door is in the closed position. A second portion 726 of the cab door is a top portion of the cab door, and a second portion 728 of the cab frame defines a top portion of the opening (626). The seal configuration further includes a second seal 730 on the second portion 728 of the cab frame configured to engage the second portion 726 of the cab door when the door is in the closed position.

When closing the cab door 624 in opening 626, as the door moves from the open position (e.g., as shown in FIG. 23) to the closed position (e.g., as shown in FIG. 21), the first portion 722 of the cab door moves the first seal 720 into engagement with the first portion 724 of the cab frame from outside of the cab. This progression of door positions can be seen FIGS. 23, 22 and 21. Also, as the door moves from the open position to the closed position, the second portion 726 of the cab door moves into engagement with the second seal 730 from inside of the cab.

FIGS. 35-36 illustrates a cushioning system 800 for engaging a cab door when the cab door approaches a closed position, according to one illustrative embodiment. The cushioning system 800 is configured to operate with cab door 624 of cab 650 as is shown in FIG. 21. The cushioning system 800 includes a pair of springs 802 and 804 that are mounted on support 648. Springs 802 and 804 are captured by a pair of spring mounts 806 and 808. A spacer 810 separates the spring 802 from the spring 804. In other embodiments, a single spring can be used instead of the pair of springs 802 and 804. A feature 812 mounted to the bracket 660 engages the mount 808 to act against the springs 802 and 804 and compress them as the door 624 approaches a closed and latched position. FIG. 35 shows the cushioning system 800 as the feature 812 is beginning to engage the mount 808. FIG. 36 shows the door 624 in a closed and latched position. As the door begins to close, the springs begin to compress and cushion the door 624. This prevents the door from slamming closed. Once the door 624 is latched, the cushioning mechanism 800 operates to apply a load against the 624 so that when the door is opened (i.e., unlatched), the cushioning mechanism applies a force against the door to urge the door toward an open position. Thus, the cushioning mechanism prevents the door from slamming closed, and helps urge the door open. While a single cushioning system 800 is shown mounted on support 648, a similar system can be mounted on support 658.

Although the present invention has been described with reference to preferred embodiments, workers skilled in the art will recognize that changes may be made in form and detail without departing from the scope of the discussion.

What is claimed is:

1. A cab for a power machine, the cab comprising:
   a cab frame forming an operator compartment and having a first side wall, a second sidewall, a front, a rear, a top and a bottom;
   a cab door configured to cover an opening in the front of the cab frame when in a closed position; and
   a first four-bar linkage coupled to the cab frame and the cab door, wherein the first four-bar linkage includes first and second links, each of which is pivotally mounted to the cab frame and the cab door, and wherein the first four-bar linkage is configured to define a path of movement for and support the cab door as the cab door moves between the closed position and an open position, wherein in the open position the cab door is positioned overhead of an operator seat beneath the cab top.

2. The cab of claim 1, wherein the first four-bar linkage is positioned within the operator compartment adjacent the first side wall.

3. The cab of claim 2, and further comprising: a second four-bar linkage positioned within the operator compartment adjacent the second sidewall and coupled to the cab frame and the cab door, the second four-bar linkage also configured to define a path of movement and support the cab door as the cab door moves between the closed position and the open position.

4. The cab of claim 2, wherein the first link of the first four-bar linkage has a first pivot connection to the cab frame configured to allow the first link to rotate relative to the cab frame, and a second pivot connection to the cab door configured to allow the first link and the cab door to rotate relative to one another.

5. The cab of claim 4, wherein the first pivot connection of the first link is positioned rearward of an operator seatback of the operator seat.

6. The cab of claim 4, wherein the first pivot connection of the first link is positioned below the operator seat.

7. The cab of claim 4, wherein the second link of the first four-bar linkage has a first pivot connection to the frame configured to allow the second link to rotate relative to the frame, and a second pivot connection to the cab door configured to allow the second link and the cab door to rotate relative to one another.

8. The cab of claim 7, wherein the first pivot connection of the second link of the first four-bar linkage is positioned forward of and above the first pivot connection of the first link.

9. The cab of claim 7, wherein the first pivot connection of the second link of the first four-bar linkage is positioned below a horizontally extending center line of the cab side wall.

10. The cab of claim 7, wherein the first pivot connection of the second link of the first four-bar linkage is positioned forward of an operator seatback of the operator seat and rearward of a joystick within the operator compartment.

11. The cab of claim 7, wherein the first link comprises a first link section and a second link section rigidly connected such that the first and second link sections of the first link do not pivot relative to each other, wherein the first and second link sections of the first link are oriented to form an obtuse angle relative to one another.

12. The cab of claim 11, wherein the second link comprises a first link section and a second link section rigidly connected such that first and second link sections of the second link do not pivot relative to each other, wherein the first and second link sections of the second link are oriented to form an obtuse angle relative to one another.

13. The cab of claim 1, wherein in the open position the cab door is positioned overhead of the operator seat and extends through an opening and rearward of a rear window of the cab.

14. The cab of claim 13, and further comprising a cover which covers opening.

15. The cab of claim 1, wherein each of the first and second links are solid links.

16. The cab of claim 15, wherein each of the first and second links have no movable joints between pivotal coupling to the cab frame and the cab door.

17. The cab of claim 1, wherein each of the first and second links are of fixed lengths.

18. The cab of claim 17, wherein each of the first and second links of fixed lengths have at least two link sections which are rigidly connected or continuously formed.

* * * * *